United States Patent
Lee et al.

(10) Patent No.: US 10,168,868 B2
(45) Date of Patent: Jan. 1, 2019

(54) METHOD AND APPARATUS FOR MULTITASKING

(71) Applicant: Samsung Electronics Co., Ltd., Gyeonggi-do (KR)

(72) Inventors: Yohan Lee, Seoul (KR); Jaehyeon Kang, Gyeonggi-do (KR); Boyeon Na, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 393 days.

(21) Appl. No.: 14/167,073

(22) Filed: Jan. 29, 2014

(65) Prior Publication Data

US 2014/0210753 A1 Jul. 31, 2014

(30) Foreign Application Priority Data

Jan. 31, 2013 (KR) .......................... 10-2013-0010905

(51) Int. Cl.
*G06F 3/0483* (2013.01)
*G06F 3/0488* (2013.01)

(52) U.S. Cl.
CPC .......... *G06F 3/0483* (2013.01); *G06F 3/0488* (2013.01)

(58) Field of Classification Search
CPC ............... G06F 3/041; G06F 2203/041; G06F 3/03547; G06F 3/0412; G06F 3/0414; G06F 3/0416; G06F 3/0418; G06F 3/046; G06F 3/047; G06F 2203/04107; G06F 2203/013; G06F 2203/014; G06F 2203/015; G06F 3/011; G06F 3/012; G06F 3/013; G06F 3/014; G06F 3/016; G06F 3/0483; G06F 3/0488; H05K 9/0073; H05K 9/0079; H05K 9/0081; H05K 9/0088

(Continued)

(56) References Cited

U.S. PATENT DOCUMENTS

| | | | |
|---|---|---|---|
| 5,463,725 A | 10/1995 | Henckel et al. | |
| 7,159,189 B2 * | 1/2007 | Weingart | G06F 3/0483 |
| | | | 715/799 |

(Continued)

FOREIGN PATENT DOCUMENTS

| | | |
|---|---|---|
| JP | 2006-155278 A | 6/2006 |
| JP | 2007-334747 A | 12/2007 |

(Continued)

OTHER PUBLICATIONS

European Search Report dated Oct. 10, 2017.
Japanese Search Report dated Nov. 7, 2017.
Japanese Notice of Allowance dated Apr. 3, 2018.

*Primary Examiner* — Grant Sitta
(74) *Attorney, Agent, or Firm* — Cha & Reiter, LLC.

(57) ABSTRACT

A method for multitasking in an electronic device is provided, the method including: displaying a first one of a plurality of function execution screens as a top layer screen on a display unit of the electronic device; receiving, by the electronic device, a first touch input; and displaying, in response to the first touch input, a first layer separation object for causing a second one of the plurality of function execution screens to be at least partially displayed as the top layer screen on the display unit; wherein the first layer separation object is displayed concurrently with the first function execution screen.

21 Claims, 14 Drawing Sheets

(58) Field of Classification Search
USPC .................................................. 345/156–173
See application file for complete search history.

(56) References Cited

U.S. PATENT DOCUMENTS

| | | | | |
|---|---|---|---|---|
| D735,219 S * | 7/2015 | Young-Ri | ........... | G06F 3/04817 D14/486 |
| 9,116,696 B2 * | 8/2015 | Tokutake | ............. | G06F 1/3262 |
| 9,128,544 B2 * | 9/2015 | Chun | ..................... | G06F 3/041 |
| 9,310,994 B2 * | 4/2016 | Hinckley | ............. | G06F 3/0483 |
| 9,471,217 B2 * | 10/2016 | Shin | ....................... | G06F 3/0482 |
| 9,619,140 B2 * | 4/2017 | Clausen | ............... | G06F 3/0481 |
| 9,916,072 B2 * | 3/2018 | Song | ..................... | G06F 3/04845 |
| 2006/0284852 A1 * | 12/2006 | Hofmeister | ........... | G06F 3/0483 345/173 |
| 2007/0252822 A1 * | 11/2007 | Kim | ...................... | G06F 3/0362 345/173 |
| 2008/0001924 A1 * | 1/2008 | de los Reyes | ...... | G06F 3/04886 345/173 |
| 2008/0297483 A1 | 12/2008 | Kim et al. | | |
| 2009/0070670 A1 * | 3/2009 | Kishi | .................. | G06F 3/04886 715/702 |
| 2009/0094562 A1 * | 4/2009 | Jeong | .................... | G06F 3/0486 715/863 |
| 2009/0158212 A1 * | 6/2009 | Dykstra-Erickson | ........................ | G06F 3/0482 715/811 |
| 2009/0267909 A1 * | 10/2009 | Chen | ................... | G06F 3/04883 345/173 |
| 2010/0079392 A1 * | 4/2010 | Chiang | ................... | G06F 3/041 345/173 |
| 2010/0138784 A1 * | 6/2010 | Colley | ............... | G06F 3/04883 715/810 |
| 2010/0182248 A1 * | 7/2010 | Chun | ..................... | G06F 3/041 345/173 |
| 2010/0185989 A1 * | 7/2010 | Shiplacoff | ............. | G06F 3/0416 715/856 |
| 2010/0211872 A1 | 8/2010 | Rolston et al. | | |
| 2010/0222113 A1 | 9/2010 | Anzai | | |
| 2010/0248689 A1 | 9/2010 | Teng et al. | | |
| 2010/0265194 A1 * | 10/2010 | Liu | ..................... | G06F 3/04883 345/173 |
| 2010/0304791 A1 * | 12/2010 | Lee | ....................... | G06F 3/0488 455/566 |
| 2010/0306693 A1 * | 12/2010 | Brinda | ................ | G06F 3/04883 715/784 |
| 2011/0209093 A1 * | 8/2011 | Hinckley | ............ | G06F 3/04817 715/834 |
| 2011/0250930 A1 * | 10/2011 | Jung | .................... | G06F 3/04817 455/566 |
| 2011/0252357 A1 * | 10/2011 | Chaudhri | ............ | G06F 3/04883 715/780 |
| 2012/0096377 A1 * | 4/2012 | Lee | ......................... | G06F 3/0486 715/769 |
| 2012/0133484 A1 * | 5/2012 | Griffin | .................... | G06F 21/51 340/5.54 |
| 2012/0180001 A1 * | 7/2012 | Griffin | ................ | G06F 3/04883 715/863 |
| 2012/0244841 A1 * | 9/2012 | Teng | ................. | H04M 1/72544 455/411 |
| 2012/0304108 A1 * | 11/2012 | Jarrett | ................. | G06F 3/04883 715/781 |
| 2013/0002524 A1 * | 1/2013 | Sirpal | .................... | G06F 1/1616 345/1.3 |
| 2013/0063383 A1 * | 3/2013 | Anderssonreimer | ........................ G06F 1/1626 345/173 |
| 2013/0117689 A1 * | 5/2013 | Lessing | ................... | G06F 3/041 715/752 |
| 2013/0120295 A1 * | 5/2013 | Kim | ......................... | G06F 3/01 345/173 |
| 2013/0141371 A1 * | 6/2013 | Hallford | ............... | G06F 3/0488 345/173 |
| 2013/0159930 A1 * | 6/2013 | Paretti | .................... | G06F 3/0482 715/821 |
| 2013/0167078 A1 * | 6/2013 | Monnig | ................ | G06F 3/0484 715/800 |
| 2013/0174179 A1 * | 7/2013 | Park | ....................... | G06F 9/4843 718/107 |
| 2013/0246970 A1 * | 9/2013 | Helle | .................... | G06F 3/0482 715/822 |
| 2013/0305184 A1 * | 11/2013 | Kim | ....................... | G06F 3/0481 715/781 |

FOREIGN PATENT DOCUMENTS

| | | |
|---|---|---|
| JP | 2009-130880 A | 6/2009 |
| JP | 2012-522464 A | 9/2012 |
| KR | 10-2008-0104857 A | 12/2008 |
| KR | 10-2012-0038827 A | 4/2012 |
| WO | 2012/044515 A2 | 4/2012 |

* cited by examiner

METHOD AND APPARATUS FOR MULTITASKING

CLAIM OF PRIORITY

This application claims the benefit under 35 U.S.C. § 119(a) of a Korean patent application filed on Jan. 31, 2013 in the Korean Intellectual Property Office and assigned Serial No. 10-2013-0010905, the entire disclosure of which is hereby incorporated by reference.

TECHNICAL FIELD

The present disclosure relates to electronic devices and more particularly to a method and apparatus for multitasking.

BACKGROUND

Mobile terminals have entered into widespread use due to their small size that permits the mobile terminals to be carried by their users with ease. Recently, the introduction of increased touchscreen sizes, and digital content diversification capabilities have dramatically accelerated the popularization of mobile terminals.

SUMMARY

Mobile terminals may support a multitasking capability enabling a plurality of applications to be executed at the same time. To make the interfaces of different applications that are executed on the same terminal, two different approaches may be adopted. One approach involves presenting one application interface per screen and allowing the user to switch between screens. A disadvantage of this approach, however, is that when there is a need to simultaneously use multiple applications, the user may be inconvenienced by the frequent switching of screens. Another approach involves, displaying thumbnails corresponding to the different applications that are being executed and allowing the user to switch between the applications by pressing the thumbnails. However, a disadvantage of this approach is that the thumbnails may be difficult to view on small-size screens. Accordingly, the need exists for new techniques for enabling multitasking in mobile terminals.

The present disclosure addresses this need. According to one aspect of the disclosure, a method for multitasking in an electronic device is provided, the method comprising: displaying a first one of a plurality of function execution screens as a top layer screen on a display unit of the electronic device; receiving, by the electronic device, a first touch input; and displaying, in response to the first touch input, a first layer separation object for causing a second one of the plurality of function execution screens to be at least partially displayed as the top layer screen on the display unit; wherein the first layer separation object is displayed concurrently with the first function execution screen.

According to one aspect of the disclosure, an electronic device supporting multitasking is provided, comprising a display unit; an input unit for detecting touch input; and a processor, configured to: display a first one of a plurality of function execution screens as a top layer screen on a display unit of the electronic device; receive a first touch input; and display, in response to the first touch input, a first layer separation object for causing a second one of the plurality of function execution screens to be at least partially displayed as the top layer screen on the display unit; wherein the first layer separation object is displayed concurrently with the first function execution screen.

DETAILED DESCRIPTION

Figure 1:
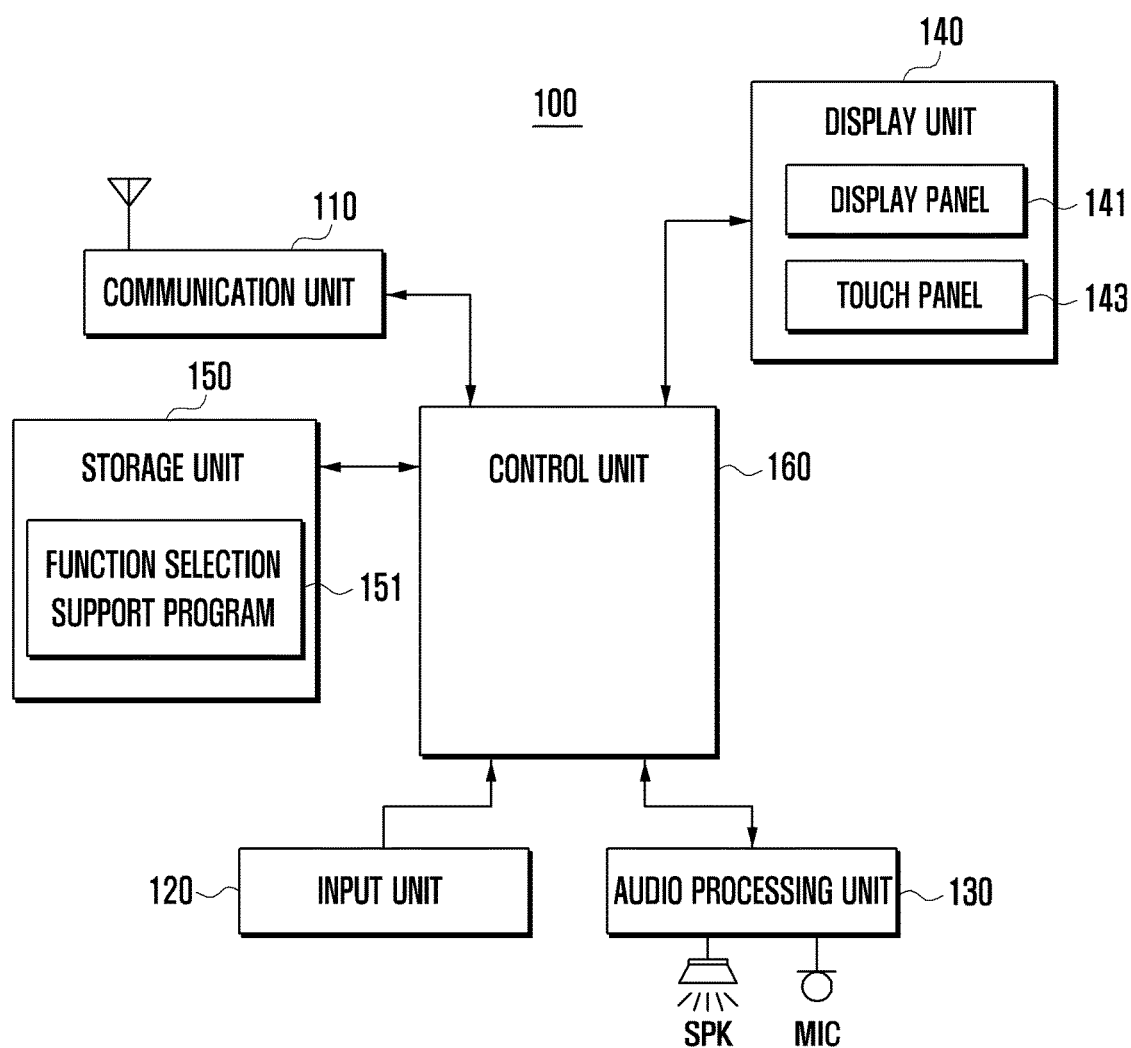
FIG. 1 is a block diagram of a mobile terminal according to aspects of the present disclosure.

Hereinafter, embodiments of the present disclosure are described in detail with reference to the accompanying drawings.

For the purposes of clarity and simplicity, detailed descriptions of well-known functions and structures incorporated herein may be omitted to avoid obscuring the subject matter of the present disclosure. Detailed descriptions of components having substantially the same configurations and functions may also be omitted.

In the drawings, some elements are exaggerated or only outlined in brief, and thus may be not drawn to scale. The present disclosure is not limited by relative sizes of objects and intervals between objects in the drawings.

FIG. 1 is a block diagram of a mobile terminal 100 according to aspects of the present disclosure. As illustrated, the mobile terminal 100 may include a communication unit 110, an input unit 120, an audio processing unit 130, a display unit 140, a storage unit 150, and a control unit 160.

The mobile terminal 100 having the above configuration provides a graphical user interface (GUI) for multitasking operation and supports performance of switching between executed functions or referencing of a different function through touch gestures made on the user interface. Hence, the mobile terminal 100 of the present disclosure enables performance of function switching or referencing in an intuitive and convenient manner through simple touch gestures.

The communication unit 110 is configured to support communication of the mobile terminal 100. The communication unit 110 may include one or more communication modules supporting distinct communication schemes. For example, the communication unit 110 may include at least one communication module supporting 2G, 3G or 4G mobile communication. The control unit 160 may activate the communication unit 110 in response to a user request and control the communication unit 110 to establish a communication channel according to the requested service. Then, the communication unit 110 may establish a communication channel suitable for a specific function associated with a user requested item. For example, the communication unit 110 may support various types of communication for a text messaging service, instant messaging service, web access service and the like. The control unit 160 may provide a function execution screen for each function supported by the communication unit 110. Here, the control unit 160 may control the display unit 140 to output a selected one of the function execution screens as a top layer screen.

The input 120 may include a keyboard, a touchpad, a trackball, a mouse, and/or any other suitable type of input unit. The input unit 120 may be configured to generate various input signals for manipulation of the mobile terminal 100. The input unit 120 may include specific keys such as a button key, side key and home key, and further include a virtual touch pad to support a full touchscreen feature. For example, the virtual touch pad may be displayed on the display unit 140 to generate an input signal corresponding to a user touch gesture. In particular, in response to a user request, the input unit 120 may generate an input signal for activating a function selection mode for multitasking operation of the present disclosure. In response to a user request, the input unit 120 may generate an input signal for deactivating the function selection mode and returning to the previous function execution mode. The generated input signal may be sent to the control unit 160 and be used as a command to execute a corresponding function. When the display unit 140 supports touch functionality, it may act as an input means. In this case, the display unit 140 supporting touch functionality may be used to generate an input signal for activating the function selection mode or for returning to the function execution mode.

The audio processing unit 130 may be configured to process various audio signals generated in the course of operating the mobile terminal 100. To this end, the audio processing unit 130 may include a speaker SPK to output an audio signal generated or decoded by the mobile terminal 100, and include a microphone MIC to collect an audio signal for a voice or video call or recording. In multitasking operation, the audio processing unit 130 may output audio data of a function associated with the top layer screen on the display unit 140 among multiple functions being executed. When the function associated with the top layer screen requires audio signal collection, the audio processing unit 130 may activate the microphone MIC to collect and process a voice signal of the user. When the display unit 140 displays a new top layer screen as a result of function switching, the audio processing unit 130 may output audio data of a function being executed and associated with the new top layer screen.

The display unit 140 is configured to output various functional screens related to usage of the mobile terminal 100. For example, the display unit 140 may include a display panel 141 to provide a variety of screens related to settings and functions provided by the mobile terminal 100, including a menu screen, multi-icon screen, multi-widget screen, standby screen and lock screen, and a touch panel 143 placed on the front or back of the display panel 141 to support generation of touch events. In particular, the display panel 141 of the display unit 140 may display a function execution screen associated with the most recently selected function among function execution screens corresponding to functions that are being executed. When an input signal for activating the function selection mode is generated according to user input, the display unit 140 may output a layer separation object to facilitate screen layer separation for intuitive function selection. The layer separation object may take various forms according to the number and types of functions currently being executed. For example, the shape of the layer separation object may be varied according to the number of currently executed functions. In the function selection mode, the layer separation object may be split into two different layer separation objects according to generation of a touch gesture. The shapes of the new layer separation objects may also be altered according to input touch gestures. The touch panel 143 may be used to generate touch events for function switching or function referencing in a region where a layer separation object is output. Utilization of a layer separation object is described in more detail later with reference to the accompanying drawings.

The storage unit 150 may include a Random Access Memory (RAM), Read-Only Memory (ROM), flash memory, a Solid-State Drive (SSD), and or any other suitable type of volatile and/or non-volatile memory. The storage unit 150 may be configured to store a variety of data and programs needed for operation of the mobile terminal 100. For example, the storage unit 150 may store an operating system for operating the mobile terminal 100, and data sent, received or entered during operation thereof. In particular, the storage unit 150 may store a function selection support program 151 to support multitasking operation of the present disclosure.

The function selection support program 151 may include one or more processor-executable functions which when executed by a processor, or any other suitable processing circuitry, cause the processor to perform a mode selection routine to support the function selection mode in a multitasking environment, and an object output routine to output a layer separation object upon activation of the function selection mode. The mode selection routine may include at least one of a routine to activate the function selection mode for a user to select the function selection mode when at least a portion on the display unit 140 is selected by the user, a routine to output an icon or menu item for activating the function selection mode, and a routine to allocate a key button or the like to the function selection mode. The object output routine may specify the shape and color of the layer separation object according to the number and type of functions currently being executed, and output the layer separation object on the display unit 140 accordingly.

The function selection support program 151 may include a routine to generate touch gestures using the layer separation object, and a routine to perform one of function switching and function referencing according to generation of a touch gesture. The function selection support program 151 may further include a routine to activate the function execution mode upon deactivation of the function selection mode.

The control unit 160 may include any suitable type of processing circuitry, such as a processor (e.g., an ARM-based processor, an x86-based processor, a MIPS-based processor), a Field Programmable Gate Array (FPGA), or an Application Specific Integrated Circuit (ASIC). Additionally or alternatively, the control unit may include a display controller, a co-processor, and/or any other suitable type of processing circuitry. The control unit 160 may be configured to control signal exchange, data processing, information collection and distribution in the mobile terminal 100 for multitasking operation of the present disclosure. The control unit 160 may have a configuration as shown in FIG. 2 for multitasking operation.

Figure 2:
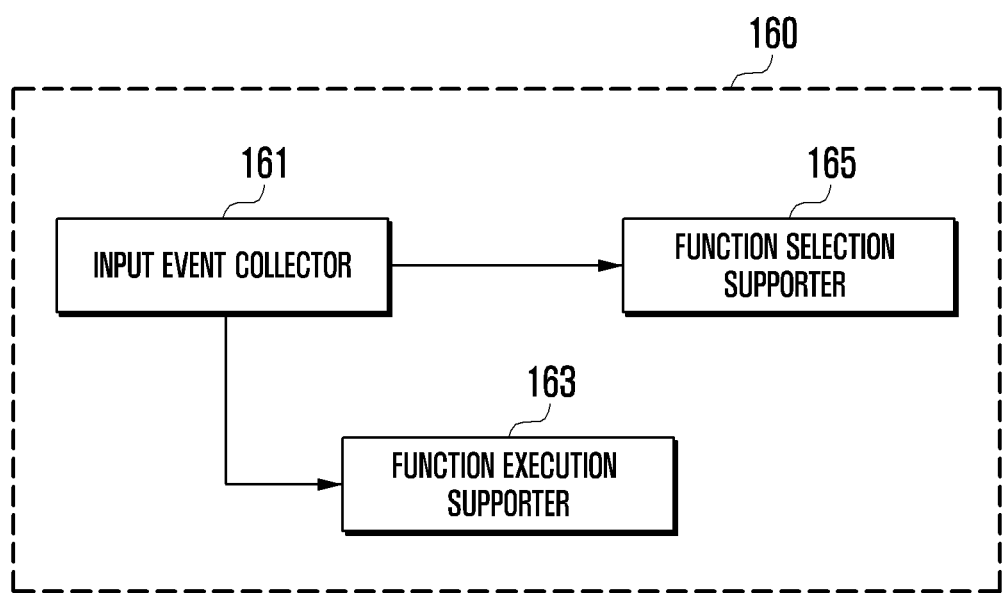
FIG. 2 is a diagram illustrating a detailed configuration of the control unit.

FIG. 2 is a diagram illustrating a detailed configuration of the control unit 160, according to aspects of the disclosure. As illustrated, the control unit 160 may include an input event collector 161, a function selection supporter 165, and a function execution supporter 163.

The input event collector 161 collects input events generated by input means including at least one of the input unit 120 and the display unit 140. In particular, the input event collector 161 collects input events related to multitasking operation of the present disclosure among input events generated by the input means. To this end, the input event collector 161 may output a list of menu items or icons permitting selection of at least one of the functions provided the mobile terminal 100. When an input event for selection of a menu item or icon associated with a terminal function is collected, the input event collector 161 may forward the input event to the function execution supporter 163.

In one embodiment, the input event collector 161 may collect an input event for activating the function selection mode in a multitasking environment. To this end, the input event collector 161 may output an icon or menu item for activation of the function selection mode. In particular, when multiple functions are being executed, the input event collector 161 may output such an icon or menu item. When an input event for activation of the function selection mode is received, the input event collector 161 may forward the input event to the function selection supporter 165. The input event collector 161 may send an input event related to function selection to the function selection supporter 165. The input event collector 161 may send an input event related to function referencing to the function selection supporter 165 and the function execution supporter 163.

Upon reception of an input event from the input event collector 161, the function selection supporter 165 may select one of a function switching operation and a function referencing operation according to the input event. Specifically, upon reception of an input event for activation of the function selection mode, the function selection supporter 165 may output a layer separation object on the display unit 140. The function selection supporter 165 may output a function execution screen of a function indicated by an input event generated on the layer separation object as the top layer screen on the display unit 140. Here, the function selection supporter 165 may change the shape of the layer separation object according to an input event. In particular, the function selection supporter 165 may split the layer separation object into two different layer separation objects, whose shapes and colors may be varied according to output positions.

The function selection supporter 165 may perform function switching or function referencing according to types and shapes of input events. For example, when a first touch gesture is input on the layer separation object, the function selection supporter 165 may select a function other than a function associated with the top layer screen on the display unit 140. That is, the function selection supporter 165 outputs a function execution screen associated with the selected function as a new top layer screen on the display unit 140.

When a second touch gesture different from the first touch gesture is input on the layer separation object, the function selection supporter 165 may activate a function reference mode. In the function reference mode, a portion of the entire function execution screen at the top layer is removed so that another function execution screen may be viewed. That is, the function selection supporter 165 may simultaneously output a section of a function execution screen associated with a first function and a section of a function execution screen associated with a second function on the display unit 140. Here, the screen associated with the first function at the top layer is displayed so that its back is viewed and the screen associated with the newly selected second function is displayed so that its front is viewed. In a function execution screen, information related to the corresponding function may be displayed at the front thereof, and information unrelated to the corresponding function or other background color may be displayed at the back thereof.

The function execution supporter 163 executes a function of the mobile terminal 100 according to an input event received from the input event collector 161. In particular, the function execution supporter 163 may apply an input event received from the input event collector 161 to a function associated with the top layer screen on the display unit 140. Thereafter, the function execution supporter 163 may update screen data according to the input event. In addition, the function execution supporter 163 may support function execution in the function reference mode. For example, when an input event occurs in a state wherein a section of a first function screen and a section of a second function screen are simultaneously output on the display unit 140, the function execution supporter 163 may execute the second function according to the input event.

Figure 3:
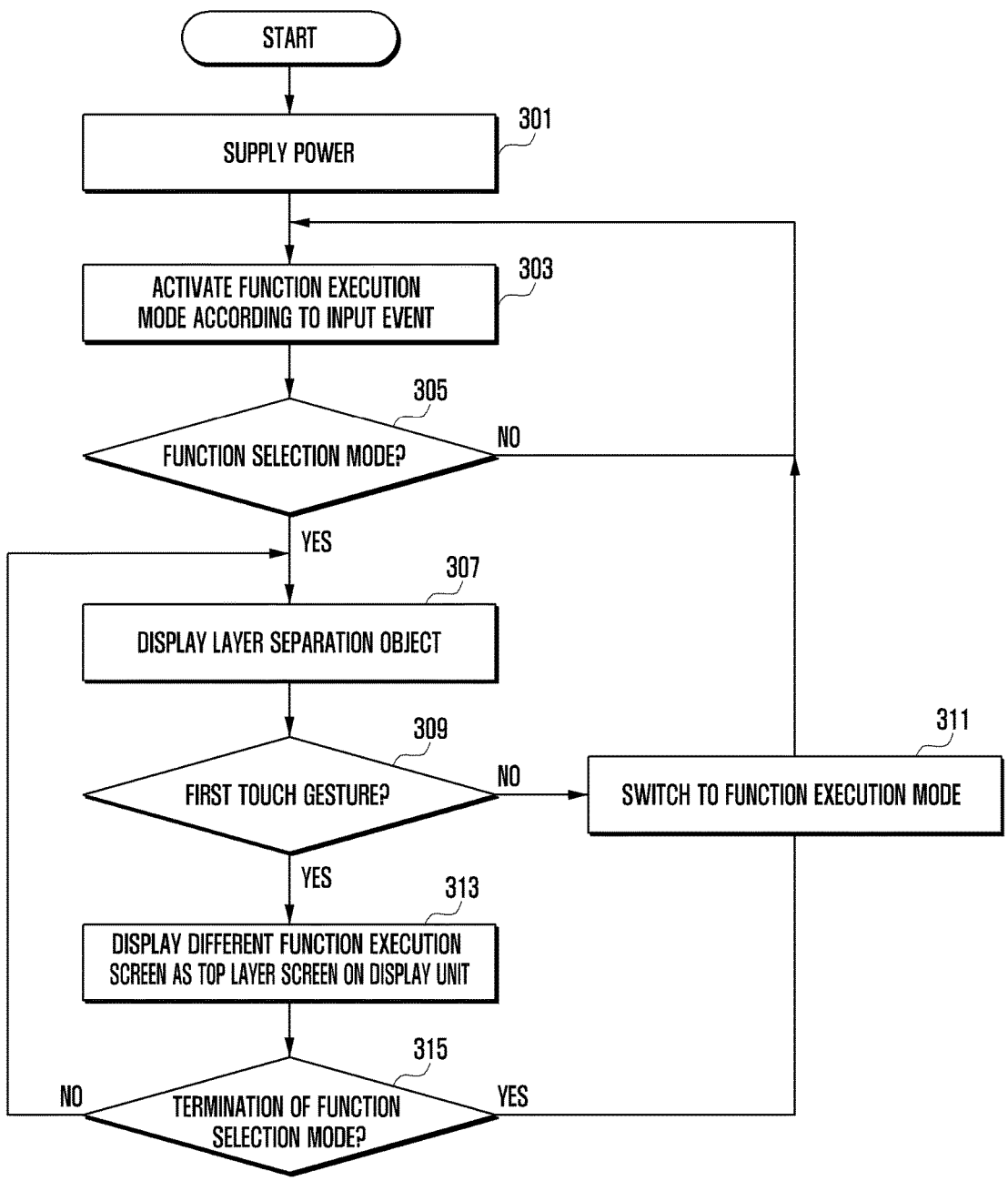
FIG. 3 is a flowchart of a process for switching between functions in a multitasking environment according to aspects of the present disclosure.

FIG. 3 is a flowchart of a process for switching between functions in a multitasking environment according to aspects of the present disclosure. At operation 301, the control unit 160 supplies power from a power source to individual components of the mobile terminal 100 so that the mobile terminal 100 is operable. At operation 303, the control unit 160 activates the function execution mode according to an input event. That is, the control unit 160 may activate a pre-scheduled function or function indicated by the input event and output a function execution screen of the activated function as a top layer screen on the display unit 140. The control unit 160 may activate multiple functions of the mobile terminal 100 and output a function execution screen for one of the activated functions at operation 303.

Upon generation of an input event, at operation 305, the control unit 160 checks whether the input event is an event for activation of the function selection mode. If the input event is not an event for activation of the function selection mode, the control unit 160 proceeds to operation 303. If the input event is an event for activation of the function selection mode, the control unit 160 proceeds to operation 307 at which the control unit 160 outputs a layer separation object on the display unit 140. For example, the layer separation object may be output at a portion near the edge of the display unit 140 or may be output at a central portion thereof according to design. Various input events, such as a preset touch gesture made at a predefined position of the display unit 140, a touch gesture of a given type and a preset key input signal, may be used as an event for activation of the function selection mode.

After output of the layer separation object, at operation 309, the control unit 160 checks whether a preset first touch gesture is input on the layer separation object. For example, the first touch gesture may be a drag action or a flick action extending from a corner of the display unit 140 to the other corner thereof. If the first touch gesture is not input, the control unit 160 proceeds to operation 311 at which the control unit 160 transitions to the function execution mode. In some implementations, the control unit 160 may proceed to operation 311 after a preset time period (e.g. N seconds) elapses from output of the layer separation object, and remain in the function selection mode with the layer separation object being output before expiration of the preset time period.

If the first touch gesture is input at operation 309, the control unit 160 proceeds to operation 313 at which the control unit 160 displays a different function execution screen corresponding to the first touch gesture as the top layer screen on the display unit 140.

At operation 315, the control unit 160 checks whether an input event for terminating the function selection mode is input or a preset time period has expired. If an input event for terminating the function selection mode is input, the control unit 160 returns to operation 311. If an input event for terminating the function selection mode is not input, the control unit 160 returns to operation 307 and continues the function selection mode.

Figure 4:
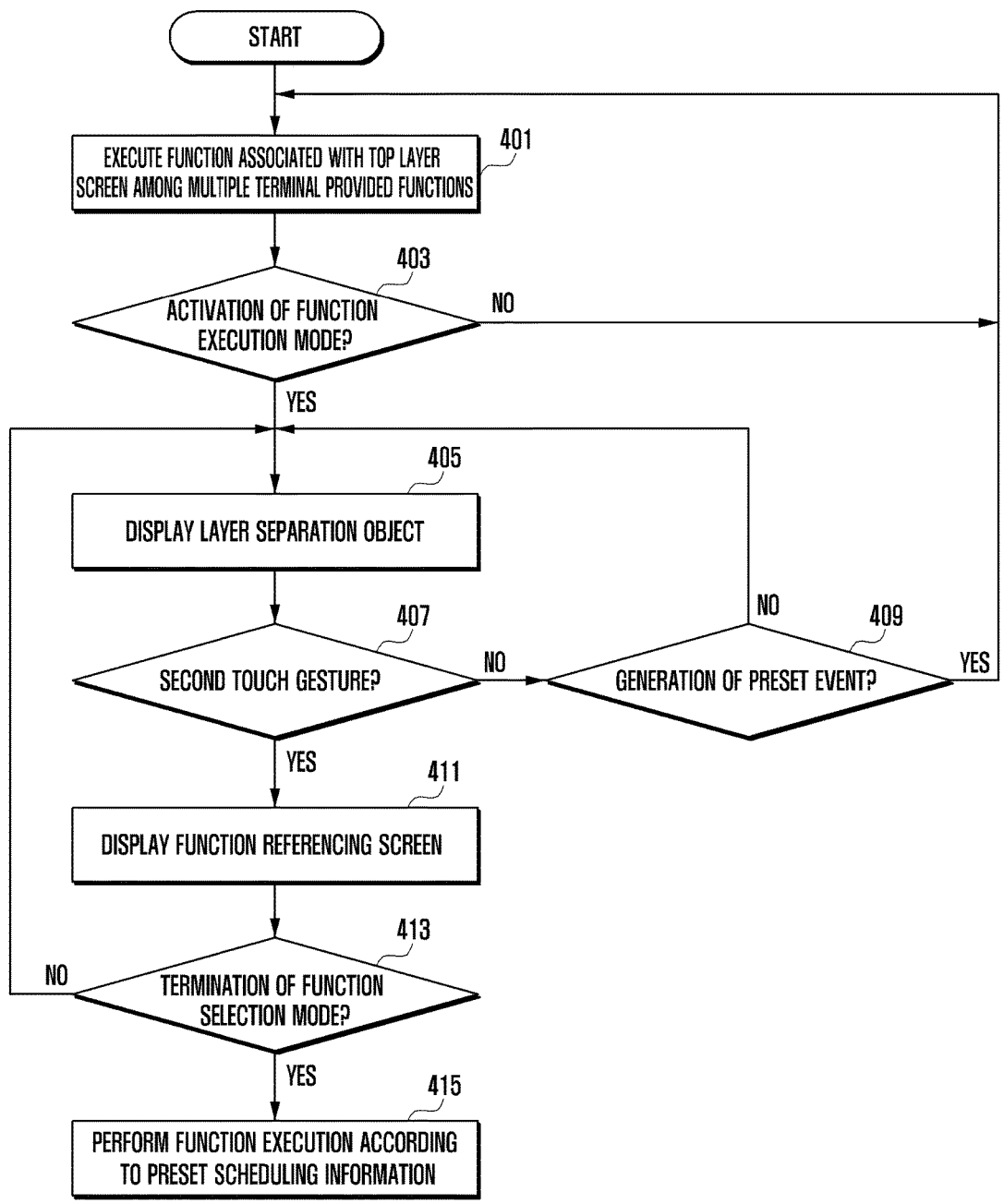
FIG. 4 is a flowchart of a process for switching between different functions according to aspects of the present disclosure.

FIG. 4 is a flowchart of a process for switching between different functions according to aspects of the present disclosure. At operation 401, the control unit 160 executes a function associated with a top layer screen, among multiple functions provided by the mobile terminal 100. The execution is performed in response to an input event or preset scheduling information. At operation 403, the control unit 160 determines whether the input event is an event for activation of the function selection mode. If the input event is not an event for activation of the function selection mode, the control unit 160 returns to operation 401. Otherwise, if the input event is an event for activation of the function selection mode, the control unit 160 proceeds to operation 405.

At operation 405, the control unit 160 outputs a layer separation object on the display unit 140. At operation 407, the control unit 160 checks whether a preset second touch gesture is input on the layer separation object. For example, the second touch gesture may a touch gesture extending from the position of the layer separation object to a position separated by a preset distance from the edge of the display unit 140. The second touch gesture may differ in one or more characteristics from the first gesture. For example, the first gesture may be shorter than the first touch gesture and may differ in direction or speed from the first touch gesture. If the second touch gesture is not input at operation 407, the control unit proceeds to operation 409. Otherwise, if the second touch gesture is input, the control unit proceeds to operation 411.

At operation 409 at which the control unit 160 checks whether a preset event is generated. For example, the preset event may correspond to at least one of expiration of a preset time period or a generation of an input signal for terminating the function selection mode. If the preset event is not generated (i.e., the preset time period has not expired or an input for terminating the function selection mode is not received before expiration of the preset time period), the control unit 160 returns to operation 405. Otherwise, if the preset event is generated at operation 409, the control unit 160 terminates the function selection mode and returns to operation 401. For example, terminating the function selection mode may include removing the layer separation object from the screen and output the function execution screen of the previously executed function on the display unit 140 in full-screen format.

At operation 411, the control unit 160 displays a function referencing screen. For example, displaying the function referencing screen may include simultaneously outputting on the display unit 140 a section of a first function screen and a section of a second function screen. Specifically, in some implementations, the section of the first function screen may be a section of the back of the first function screen, and the section of the second function screen not overlapping with the section of the first function screen may be a region in which information on execution of the second function is output.

At operation 413, the control unit 160 checks whether an input event for terminating the function selection mode is generated. If an input event for terminating the function selection mode is generated, the control unit 160 proceeds to operation 415 at which the control unit 160 executes a given function according to preset scheduling policy that is followed by the control unit 160. For example, the control unit 160 may execute a function that has output execution information immediately before termination of the function selection mode. The control unit 160 may also execute a function that has been executed immediately before activation of the function selection mode.

If an input event for terminating the function selection mode is not generated, the control unit 160 returns to operation 405 and continues display of the layer separation object. For example, the control unit 160 may display a layer separation object in relation to the function referencing screen. That is, the control unit 160 displays a first layer separation object first. When the function referencing screen is displayed according to an input event, the control unit 160 may split the first layer separation object into two layer separation objects and display the two layer separation objects in specific regions of the screen. Display of the two layer separation objects is described in more detail later with reference to the drawings.

In the above description, specific touch gestures are used as events for entering the function selection mode, performing function switching, and performing function referencing. However, the present disclosure is not limited thereto. In some implementations, instead of touch gestures, preset motion sensor signals or physical key inputs may be used as events for multitasking operation of the present disclosure. To this end, the mobile terminal 100 may include at least one of various sensors capable of generating motion sensing signals, such as an acceleration sensor, gyro sensor, geomagnetic sensor, direction sensor, and piezoelectric sensor. In addition, to generate physical key input events, various key buttons of the input unit 120 may be mapped with events for the function selection mode.

Figure 5:
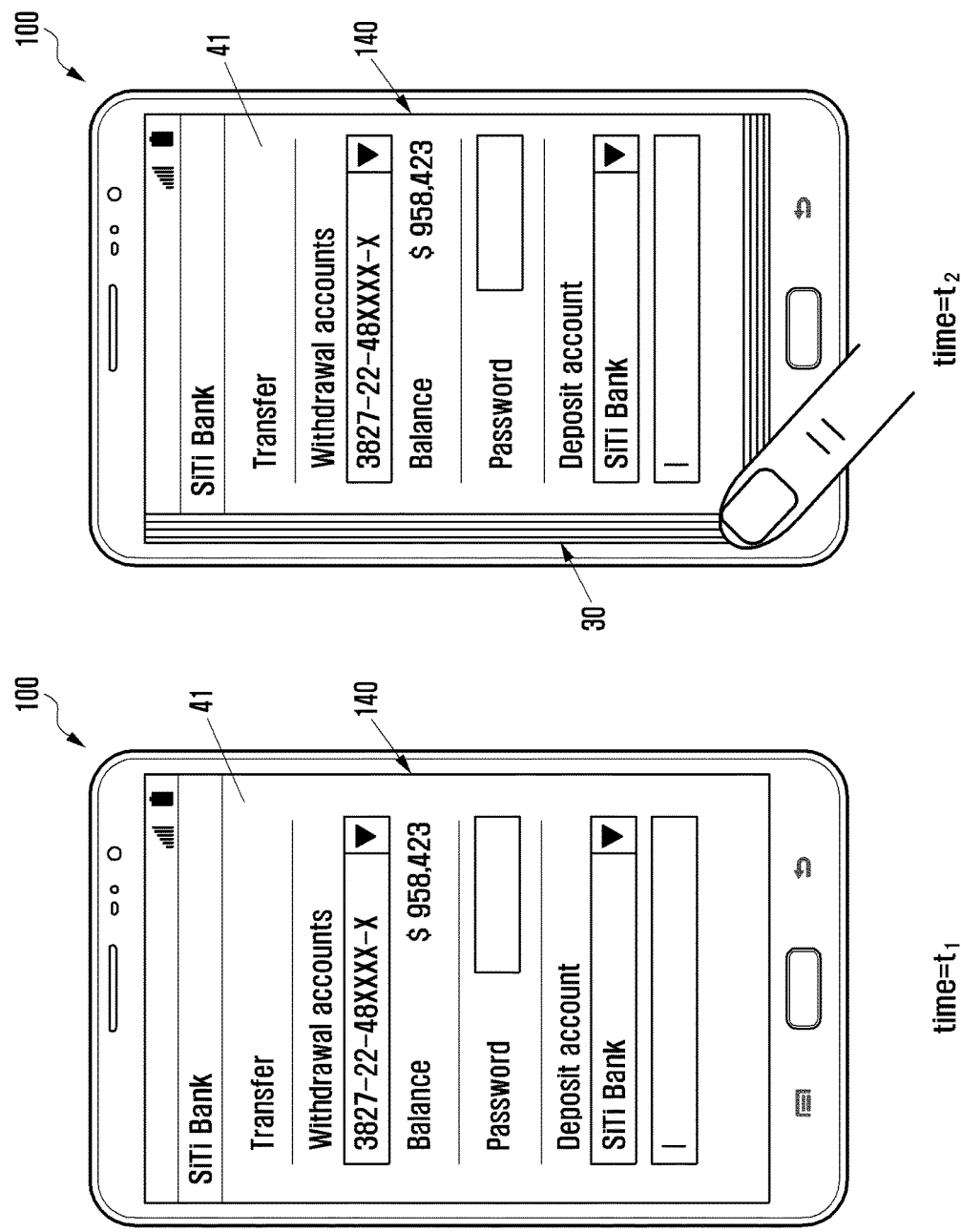
FIG. 5 is a diagram illustrating an example of a screen interface of the mobile terminal according to an embodiment of the present disclosure.

FIG. 5 illustrates an example of a screen interface of the mobile terminal 100 according to aspects of the disclosure.

Referring to FIG. 5, the mobile terminal 100 may activate multiple functions according to a user request or preset scheduling information and provide function execution screens associated respectively with the multiple functions.

Thereafter, the mobile terminal 100 may output a first function execution screen 41 selected by the user among the function execution screens on the display unit 140 in a full-screen format. That is, the first function execution screen 41 selected by the user may be displayed as a top layer screen on the display unit 140. The mobile terminal 100 may maintain the remaining function execution screens excluding the first function execution screen 41 on the display unit 140 through background processing. Here, the mobile terminal 100 may activate the function associated with the first function execution screen 41 output as the top layer screen on the display unit 140 and may continue or pause execution of the remaining functions whose function execution screens are hidden according to function settings. The mobile terminal 100 may immediately output the function execution screens, other than the first function execution screen 41, on the display unit 140 according to an input event without a separate action.

When a preset input event such as an input event for activating the function selection mode is generated at time $t_1$, the mobile terminal 100 may output a layer separation object 30 at a portion of the display unit 140 at time $t_2$. Here, the layer separation object 30 may be output as an overlay on the first function execution screen 41 or be output in a region allocated so as not to overlap with the first function execution screen 41. Thereto, the mobile terminal 100 may shift the first function execution screen 41 on the display unit 140 to allocate a non-overlapping region in which the layer separation object 30 is to be output.

The mobile terminal 100 may output the layer separation object 30 in response to a preset input event. For example, when a touch event is generated for a given type of input such as a long press or a double tap that is input at an edge portion of the display unit 140 at time $t_1$ or when a touch gesture of a given shape is input, the mobile terminal 100 may output the layer separation object 30. As another example, when a specific key such as the home key or a side key is mapped with layer separation object output, the mobile terminal 100 may output the layer separation object 30 on the display unit 140 in response to selection of the home key or side key. As yet another example, when a preset motion sensing signal (for example, indicating tilting of the mobile terminal 100 in a direction for a preset time, indicating shaking of the mobile terminal 100 a preset number of times or more by an angle greater than given degrees, or indicating the performance of a preset input action) is generated, the mobile terminal 100 may output the layer separation object 30.

When no input event is generated within a preset time after output of the layer separation object 30, the mobile terminal 100 may remove the layer separation object 30 from the display unit 140 and output the first function execution screen 41 on the display unit 140 in full-screen format (as it was displayed at time $t_1$). Alternatively, when an input event for terminating the function selection mode (or pausing output of the layer separation object 30) is received, the mobile terminal 100 may remove the layer separation object 30 from the display unit 140 and output a suitable function execution screen.

Figure 6:
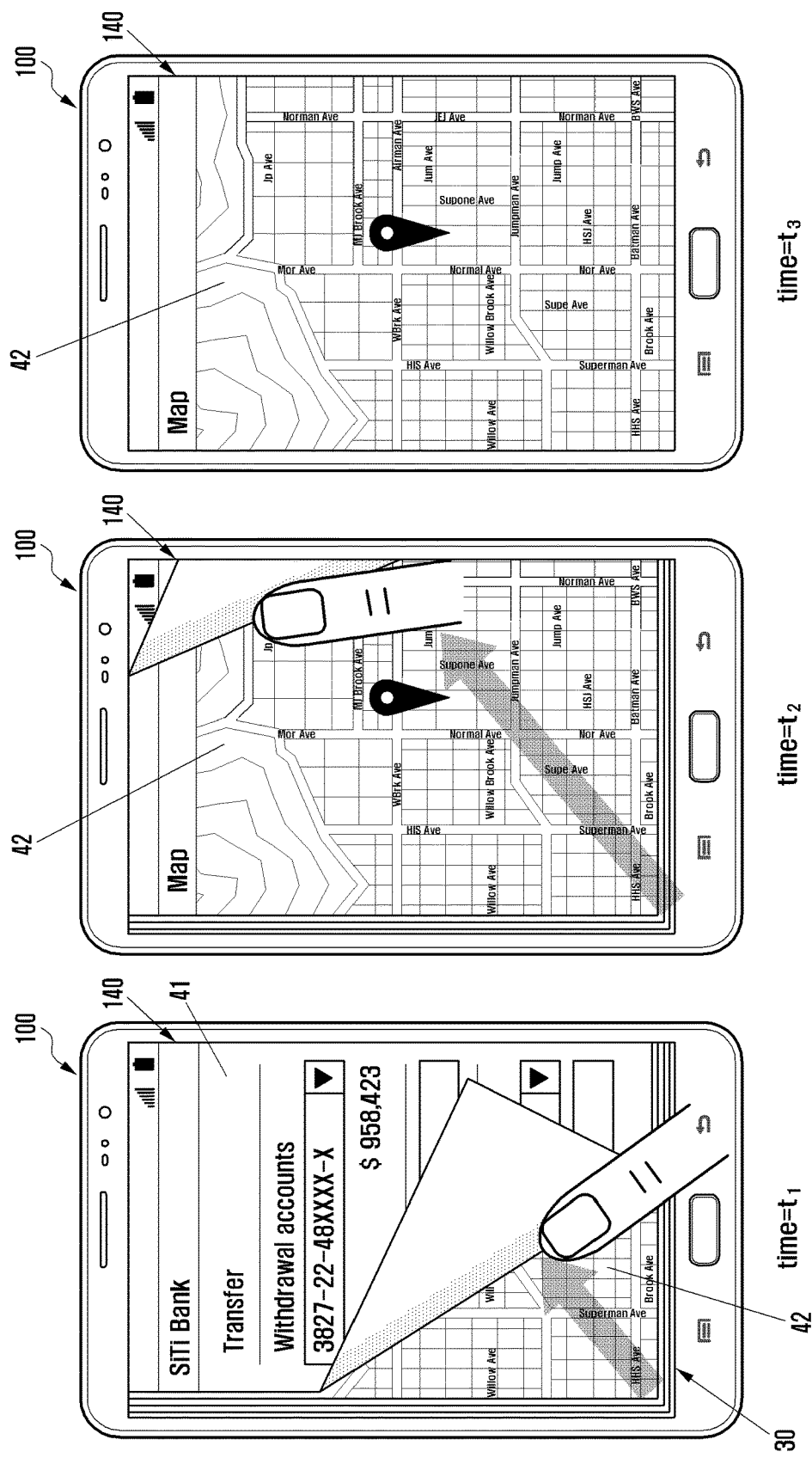
FIG. 6 is a diagram illustrating a technique for switching between functions in a function selection mode according to aspects of the present disclosure.

FIG. 6 illustrates a technique for switching between functions in a function selection mode according to aspects of the present disclosure. At time $t_1$, the mobile terminal 100 may enter the function selection mode and output a layer separation object 30 according to an input event or scheduling information. In some implementations, the shape (or appearance) of the layer separation object 30 may be varied based on the number of functions currently being executed.

Specifically, the layer separation object 30 may be represented by a plurality of separate lines, wherein the number of lines equals the number of functions being executed and each line may act as an indicator indicating a corresponding function. Hence, when the number of executed functions is relatively large, the width of the layer separation object 30 may become wider; and when the number of executed functions is relatively small, the width thereof may become narrower.

The user may use the layer separation object 30 to perform function switching. For example, in response to a first touch gesture being performed, at time $t_1$, on the layer separation object 30 arranged along the left edge and lower edge of the display unit 140, the mobile terminal 100 may remove, at time $t_2$, a first function execution screen 41 at the top layer from the display unit 140 and display a second function execution screen 42 on the display unit 140. As illustrated, the second function execution screen may be displayed in accordance with the first touch gesture. For example, the first touch gesture may be a drag or flick action extended from the lower left corner to the upper right edge on the display unit 140.

Figure 7:
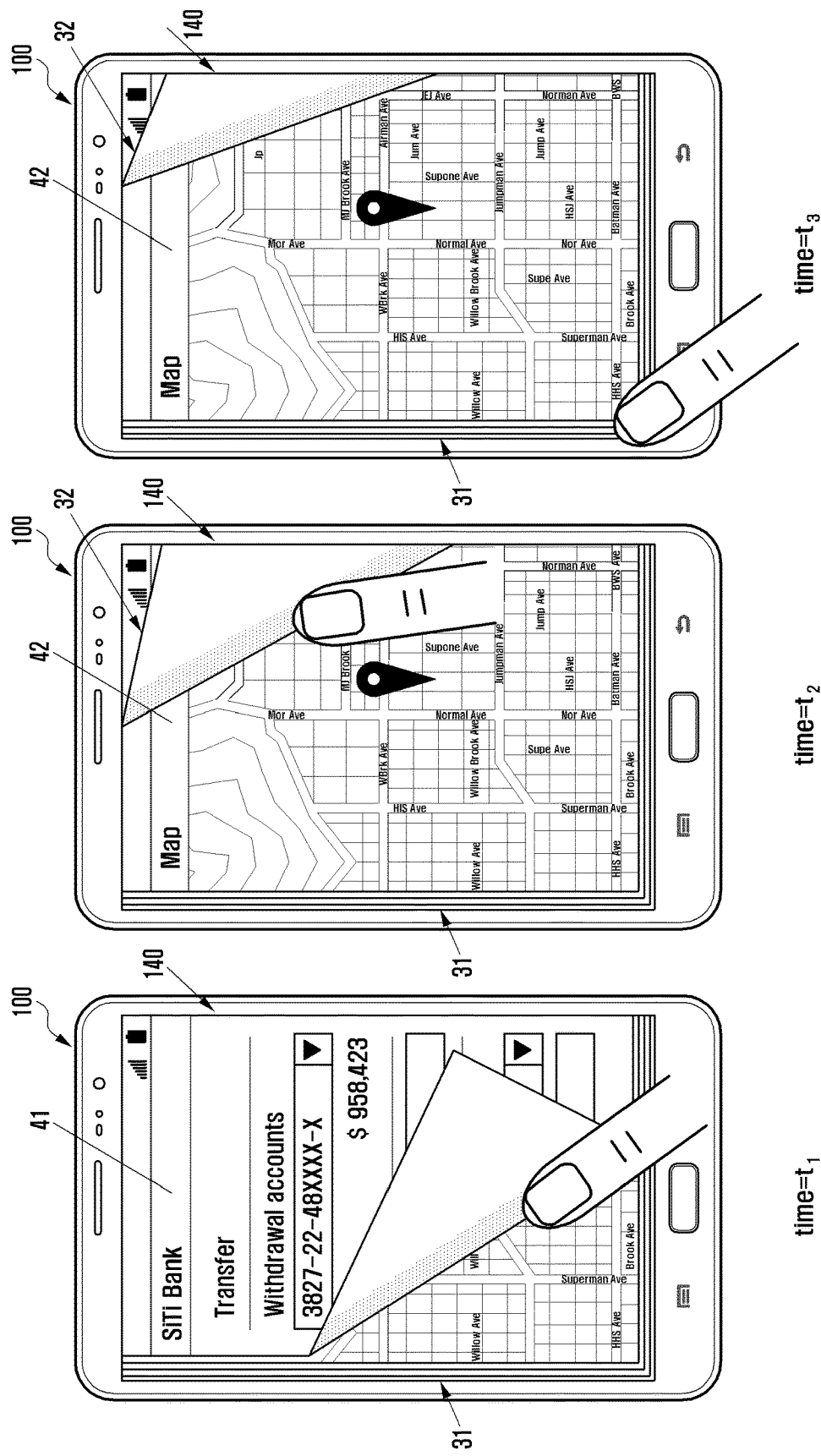
FIG. 7 is a diagram illustrating another technique for switching between functions in a function selection mode according to aspects of the present disclosure.

When the first function execution screen 41 is completely removed from the display unit 140 and the second function execution screen 42 is fully displayed on the display unit 140 according to the first touch gesture, the mobile terminal 100 may automatically terminate the function selection mode and return to the function execution mode for execution of the second function. In this process, while the shape (or appearance) of the first function execution screen 41 is changed according to the first touch gesture, the shape of the layer separation object 30 (particularly the width thereof) may also be changed. While the first function execution screen 41 is removed from the display unit 140, the back of the first function execution screen 41 is gradually changed and the front of the second function execution screen 42 is gradually displayed on the display unit 140. The mobile terminal 100 may sustain display of the layer separation object 30 for a preset time period after complete removal of the first function execution screen 41 from the display unit 140 and may remove the layer separation object 30 from the display unit 140 after that time period has expired. Upon complete removal of the first function execution screen 41 from the display unit 140, the mobile terminal 100 may set the first function execution screen 41 as the last one in a logical sequence of the screens of all functions that are being executed at the mobile terminal 100, and restore the shape of the layer separation object 30 (particularly width thereof) to the state it was in at time $t_1$. That is, the width or another characteristic of shape or appearance of the layer separation object 30, may transition from a first state, in which the layer separation object 30 was at time $t_1$, to a second state, at time $t_2$, and then return to the first state, at time $t_3$. In that regard, the layer separation object may assume a different shape (or appearance) during a period of transition between two screens FIG. 7 illustrates a technique for switching between functions in a function selection mode according to aspects of the present disclosure. At time $t_1$, the mobile terminal 100 may output a first layer separation object 31 on the display unit 140 according to an input event or scheduling information. Thereafter, at time $t_2$, the mobile terminal 100 may remove the first function execution screen 41 from the display unit 140 according to a touch event and output the second function execution screen 42. For example, according to a second touch gesture, the mobile terminal 100 may sustain, at time $t_3$, output of the first layer separation object 31 without switching from a first function to a second function. In particular, response to a second touch gesture that does not completely pass across the entire area of display unit 140, the mobile terminal 100 may display the back of a remaining section of the first function execution screen 41 (upper right edge region) as a second layer separation object 32.

While the back of the remaining section of the first function execution screen 41 is displayed as the second layer separation object 32, the user may use the first layer separation object 31 to bring up a different function execution screen (third function execution screen) on the display unit 140. In this case, the second function execution screen 42 may be handled in a manner similar to the manner in which the first function execution screen 41 is handled. Namely, the second function execution screen 42 may be gradually removed in part from the display unit 140 so that the back of the remaining section of the second function execution screen 42 partially overlaps with the back of the remaining section of the first function execution screen 41. Accordingly, the second layer separation object 32 may be represent an overlap region between the back of the remaining section of the first function execution screen 41 and the back of the remaining section of the second function execution screen 42, while a third function execution screen (not shown) is output on the display unit 140. In a similar manner, the user may manipulate the mobile terminal 100 so that the third function execution screen is partially removed from the display unit 140 and another function execution screen is partially output on the display unit 140.

In the above process, whenever a function execution screen is shifted from the first layer separation object 31 to the second layer separation object 32, the width of the first layer separation object 31 may be decreased according to the number of removed function execution screens and the width of the second layer separation object 32 may be increased according to the number of added function execution screens.

Thereafter, when no input event is generated within a preset time period or an input event for terminating the function selection mode is generated, the mobile terminal 100 may display the function execution screen whose front is currently viewed in a full screen format on the display unit 140. For example, when no input event is generated within a preset time period or a preset input event is generated while the display unit is in a state as shown with respect to time $t_3$, the mobile terminal 100 may remove the first layer separation object 31 and the second layer separation object 32 from the display unit 140 and display the second function execution screen 42 in full screen format.

Figure 8:
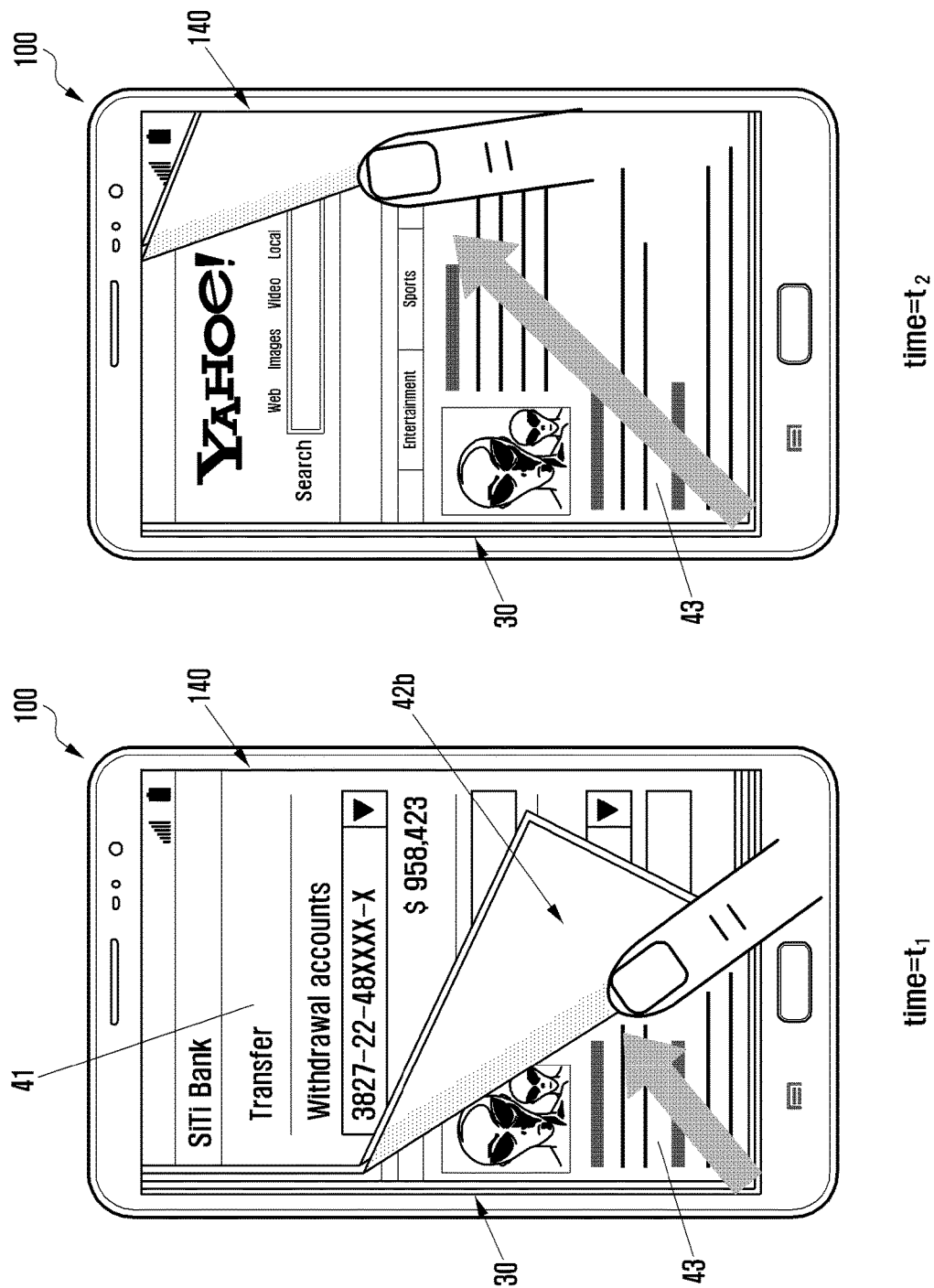
FIG. 8 is a diagram illustrating yet another technique for switching between functions in a function selection mode according to aspects of the present disclosure.

FIG. 8 illustrates a technique for switching between functions in a function selection mode according to aspects of the present disclosure. At time $t_1$, the mobile terminal 100 may display a function execution screen of a selected function among multiple functions being executed as a top layer screen on the display unit 140. Furthermore, at time $t_1$, in response to an input event for activating the function selection mode or preset scheduling information, the mobile terminal 100 may output a first function execution screen 41 together with a layer separation object 30 on the display unit 140.

The user may use the layer separation object 30 to refer to a function execution screen of a different function or to transition to a different function. In particular, the user may select multiple lines of the layer separation object 30 indicating different functions to thereby skip one or more function execution screens at a time. According to a touch gesture, the mobile terminal 100 may select at least one of the lines of the layer separation object 30 corresponding respectively to multiple function execution screens and remove the function execution screens corresponding to the selected lines. The number of execution screens selected may be based on one or more contact properties of the touch gesture, such as contact location, the number of contacts, contact maintenance time and the number of simultaneous contacts, and removal of the function execution screen may be performed according to the type of the touch gesture such as drag, flick, double tap or multi-touch.

For example, at time $t_1$, the mobile terminal 100 may be in a state in which the function execution screens of five functions currently being executed overlap with each other and the first function execution screen 41 is the top layer screen on the display unit 140. While in this state, in response to a touch gesture that is performed on the layer separation object 30, the mobile terminal 100 may permit simultaneous selection of multiple function execution screens including the first function execution screen 41. For example, the mobile terminal 100 may select the first function execution screen 41 and second function execution screen at once according to a touch gesture (e.g., a touch). Thereafter, upon generation of another touch gesture for function switching or referencing (e.g., a drag), the mobile terminal 100 may simultaneously remove the first function execution screen 41 and second function execution screen from the display unit 140 and output a third function execution screen 43 on the display unit 140. In some implementations, the third function execution screen 43 may be gradually displayed on the display unit 140 as the position of a region 42b, which represents the back of the first function execution screen 41 and second function execution screen being overlapped, recedes towards the edge(s) of the display unit 140.

Upon complete removal of the region 42b, the mobile terminal 100 may output the third function execution screen 43 in full screen format on the display unit 140, complete switching to the third function, and return to the function execution mode. Alternatively, the mobile terminal 100 may sustain display of the layer separation object 30 for a preset time period to support continuous switching between function execution screens, before displaying the third function execution screen 43 in full screen format on the display unit 140. Alternatively, upon generation of a touch gesture or key input signal for terminating the function selection mode, the mobile terminal 100 may output the third function execution screen 43 in full screen format and perform switching to the third function. After switching to the third function, in response to generation of an input event, the mobile terminal 100 may apply the input event to the third function and update the third function execution screen 43 accordingly.

Figure 9:
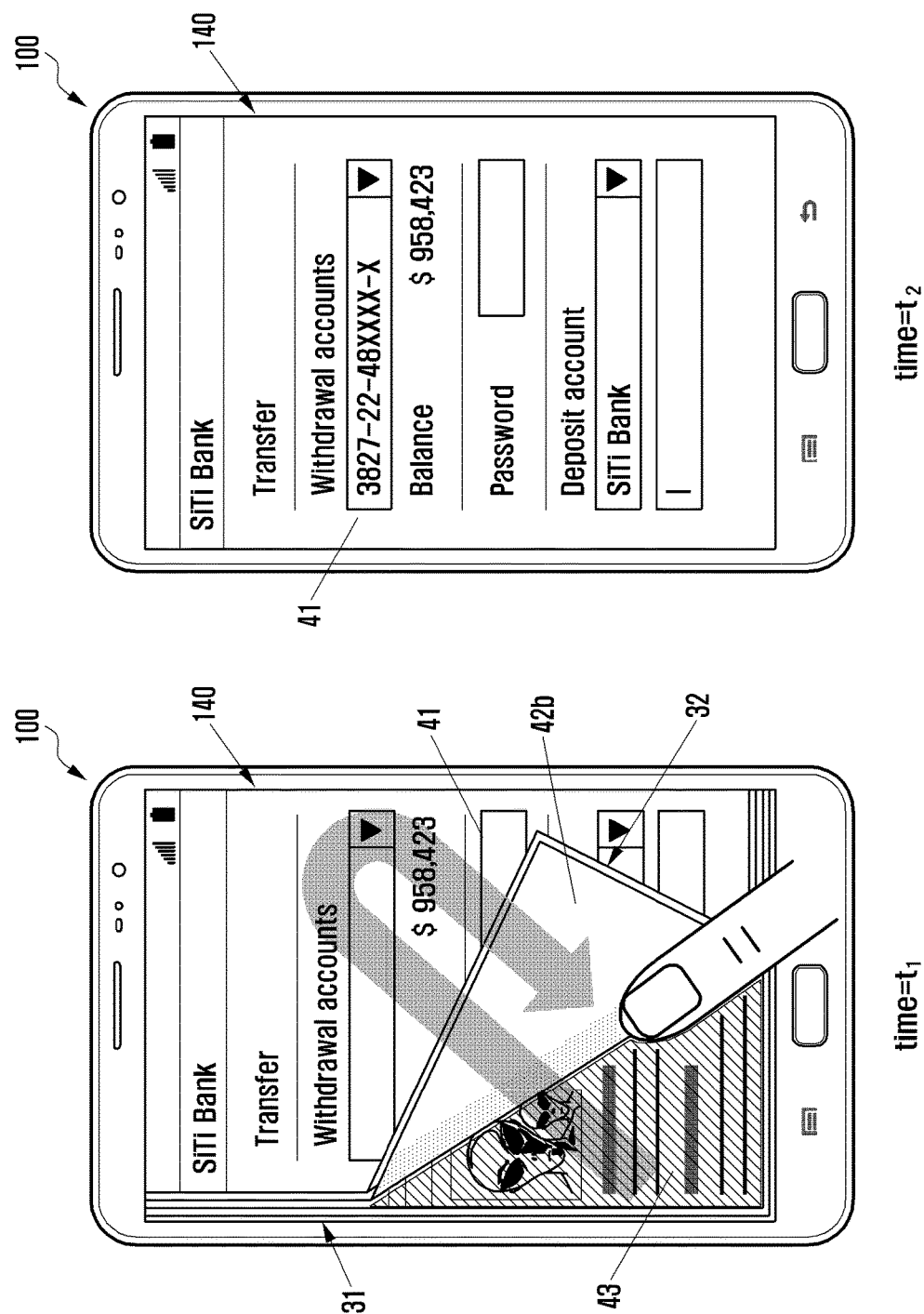
FIG. 9 is a diagram illustrating yet another technique for switching between functions in a function selection mode according to aspects of the present disclosure.

FIG. 9 illustrates a technique for switching between functions in a function selection mode according to aspects of the present disclosure. At time $t_1$, the mobile terminal 100 may execute multiple functions according to a user request and provide function execution screens associated respectively with the executed functions. For example, the mobile terminal 100 may display only a selected one of the function execution screens as a top layer screen in a full screen format on the display unit 140. In addition, the mobile terminal 100 may maintain the remaining function execution screens not displayed at the top layer through background processing so that any one thereof may be displayed at the top layer immediately upon request.

In some aspects, upon generation of an input event for activating the function selection mode in the form of a touch gesture, key input signal, motion sensor signal or voice recognition signal, the mobile terminal 100 may output a first layer separation object 31 on the display unit 140. As described before, the user may use the first layer separation object 31 to transit to or refer to a function execution screen other than the top layer screen. In particular, as shown with respect to time $t_1$, in response to a touch gesture or any other suitable input, the mobile terminal 100 may fold the first function execution screen 41 and the second function execution screen so that a region 42b representing the backs of the first function execution screen 41 and the second function execution screen, is overlaid on a section of the first function execution screen 41, and a section of the third function execution screen 43 is displayed in the space previously occupied by the folded portions of the first function execution screen 41 and the second function execution screen 42. Moreover second layer separation object 32 may be output in the region 42 permitting the folded function screens to be folded-back one-by-one.

The mobile terminal 100 may remain in the state shown with respect to time $t_1$ for a sufficient time so that the user may readily view information displayed on the third function execution screen 43. When an input event is generated in a function referencing state (i.e. state in which at least one of the region 42b and the second layer separation object 32 is displayed), the mobile terminal 100 may apply the input event to the third function execution screen 43. Hence, the mobile terminal 100 may support selection, copy, movement or storage of information and invocation of linked information on the third function execution screen 43 according to a generation of an input event. If the third function execution screen 43 is associated with an information search function, the mobile terminal 100 may support entering of a search word, searching for information based on the search word, and copy or movement of search results through the third function execution screen 43.

In particular, the mobile terminal 100 may apply a touch gesture input in a region of the display unit 140 where the third function execution screen 43 is displayed to the third function associated with the third function execution screen 43, and may apply a touch gesture input in a region of the display unit 140 where the first function execution screen 41 is displayed to the first function associated with the first function execution screen 41. Hence, the user may easily move information found in the third function execution screen 43 to the first function execution screen 41 or write such information in a field of the first function execution screen 41.

As described above, the user may refer to the third function execution screen 43 while manipulating the first function execution screen 41. Upon completion of referencing, the user may generate a touch gesture on the second layer separation object 32, as shown with respect to time $t_1$, to restore the first function execution screen 41. According to a touch gesture input on the second layer separation object 32, the mobile terminal 100 may display the first function execution screen 41 in full screen format on the display unit 140. Here, according to the type, direction, location or touch count of a touch gesture input on the second layer separation object 32, the mobile terminal 100 may display a section of the second function execution screen on a section of the third function execution screen 43. In this case, the second layer separation object 32 may be changed in shape so as to represent only the folded region of the first function execution screen 41. The lower left edge region of the first layer separation object 31 may also be changed in number of lines according to movement of the second function execution screen. Alternatively, the mobile terminal 100 may remove the second layer separation object 32 at once according to generation of a preset touch gesture or key input signal, rapidly restoring the first function execution screen 41.

Figure 10:
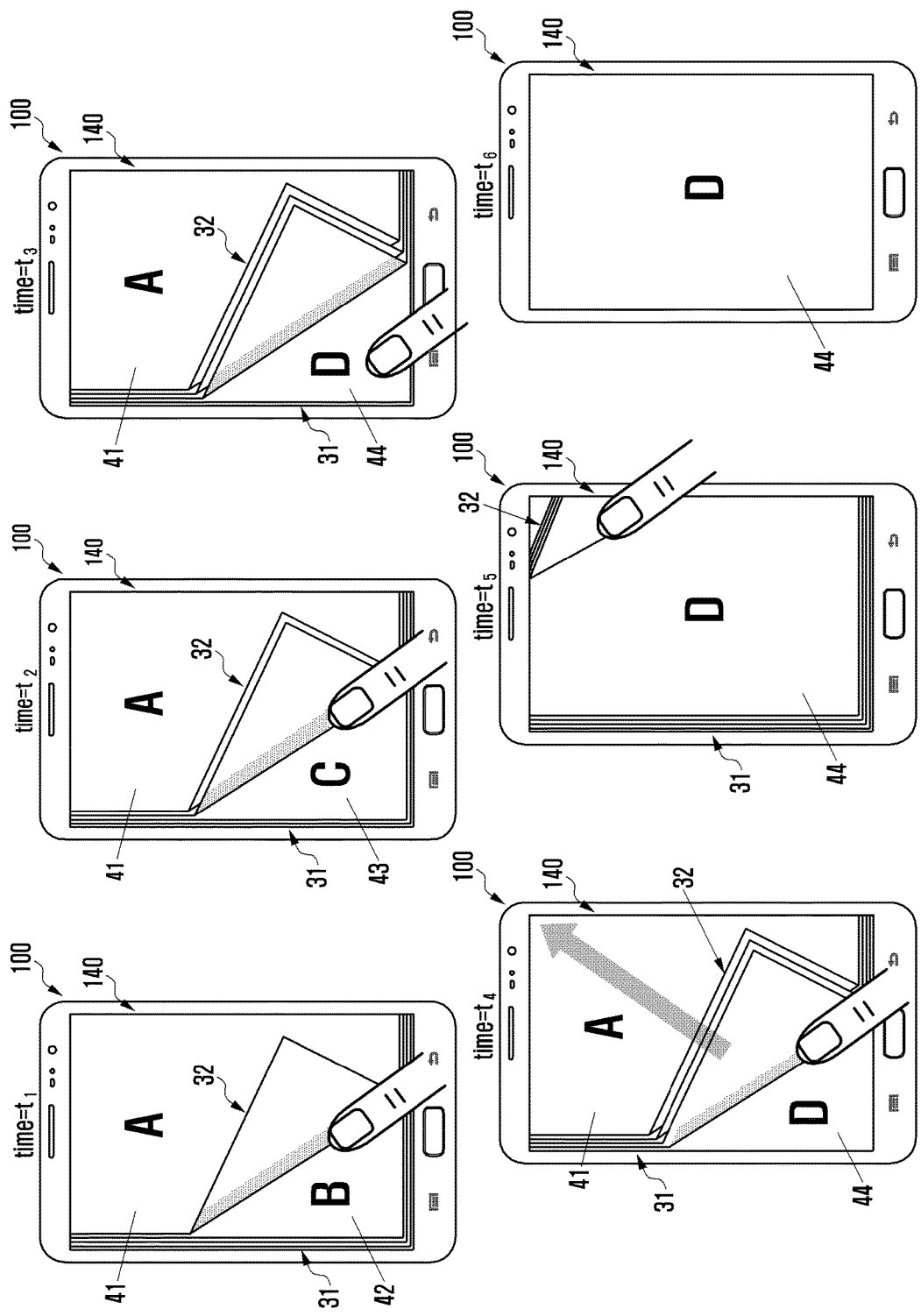
FIG. 10 is a diagram illustrating yet another technique for switching between functions in a function selection mode according to aspects of the present disclosure.

FIG. 10 illustrates a technique for switching between functions in a function selection mode according to aspects of the present disclosure. At time $t_1$ the mobile terminal 100 may activate the function selection mode according to a user request and display a first layer separation object 31, as shown. When a touch gesture such as drag or flick extending from the first layer separation object 31 to a position near the lower left edge of the display unit 140 is input, the mobile terminal 100 may fold a lower left section of the first function execution screen 41 at the top layer and assign the folded section as a second layer separation object 32. In some implementations, the mobile terminal 100 may display a region of the second function execution screen 42 in a space previously occupied by the folded portion of the first function execution screen 41. Hence, the user may readily identify a function associated with the second function execution screen 42 by viewing the region of the second function execution screen 42 revealed by the folding of the first function execution screen 41.

At time $t_2$, a new touch gesture extending from the first layer separation object 31 to the second layer separation object 32 is input to identify another function execution screen. In response to the new touch gesture, the mobile terminal 100 may fold a lower left section of the second function execution screen 42 so that the folded section thereof overlaps with the folded section of the first function execution screen 41, thereby updating the second layer separation object 32. The mobile terminal 100 may also display a region of the third function execution screen 43 on a space previously occupied by the folded portion of the second function execution screen 42. In some implementations, the second layer separation object 32 may correspond to the overlapping region of the backs of the folded sections of the first and second function execution screens 41 and 42.

At time $t_3$, the user may select and move a section of the third function execution screen 43 so that the third function execution screen 43 is added to the second layer separation object 32. As shown, a region of the fourth function execution screen 44 is output in a lower left region of the display unit 140 that was previously occupied by the folded portion of the third function execution screen 43, and the first to third function execution screens constitute the second layer separation object 32.

At time $t_4$, the user may initiate a touch gesture extending from the second layer separation object 32 through the upper right corner to the outside of the display unit 140. At time $t_5$, the mobile terminal 100 may start moving the second layer separation object in accordance with the initiated touch gesture towards the upper right corner of the display unit 140. At time $t_6$, the mobile terminal 100 may remove the second layer separation object 32 corresponding to the first to third function execution screens from the display unit 140 and output the fourth function execution screen 44 on the display unit 140 in full screen format. In some implementations, at time $t_6$, the mobile terminal 100 may also terminate the function selection mode. In this case, the first layer separation object 31 is removed from the display unit 140.

Figure 11:
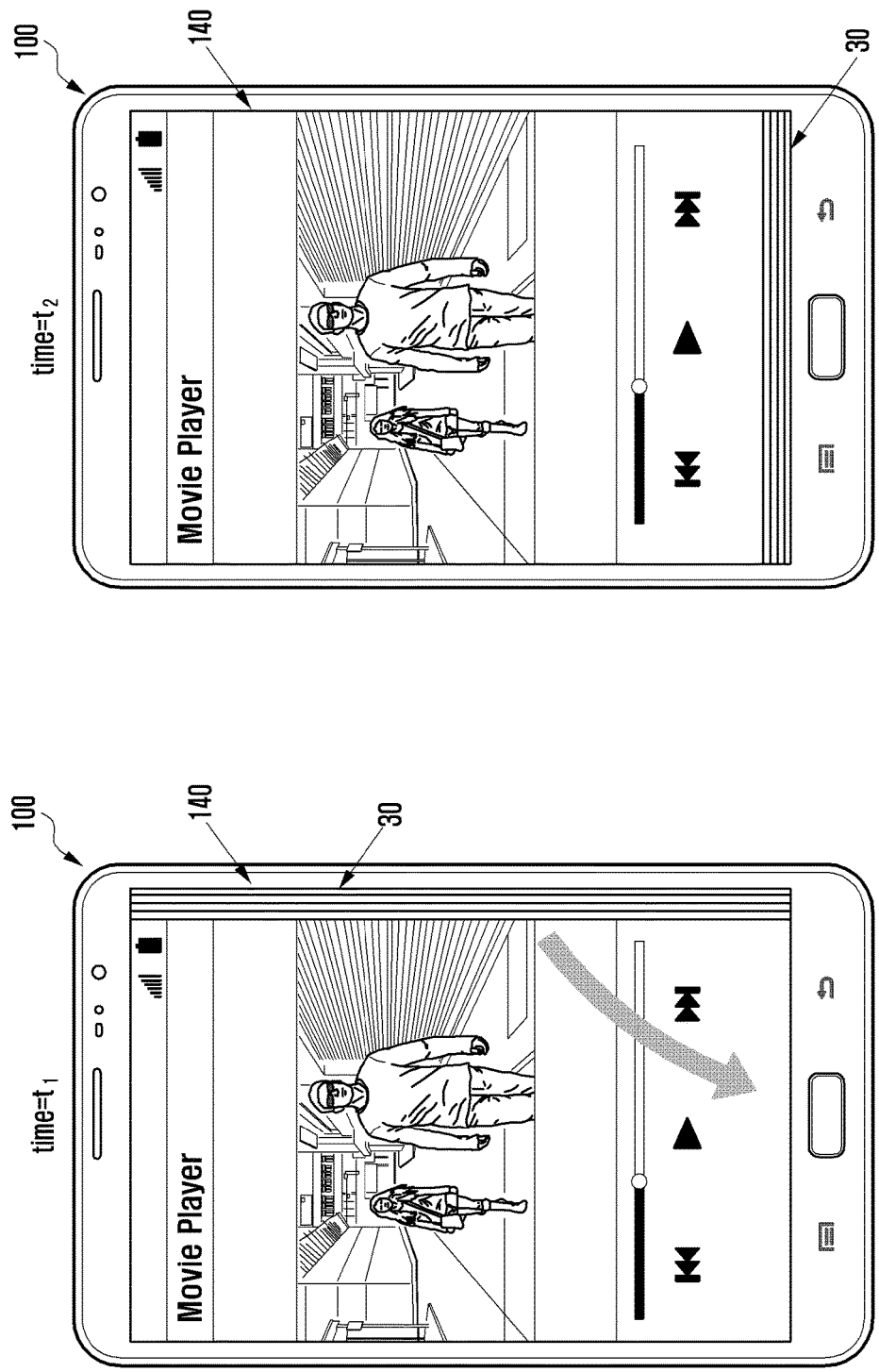
FIG. 11 is a diagram illustrating yet another technique for switching between functions in a function selection mode according to aspects of the present disclosure.

FIG. 11 illustrates a technique for switching between functions in a function selection mode according to aspects of the present disclosure. At time $t_1$, upon activation of the function selection mode, the mobile terminal 100 may examine preset scheduling information and output a first layer separation object 30 at a given position according to the scheduling information. As illustrated, in this example, the first layer separation object 30 may be arranged along the right edge of the display unit 140. However, the position of the first layer separation object 30 is not limited thereto. For example, the first layer separation object 30 may be represented by a shape arranged along the upper edge and right edge or by a shape arranged along the upper edge and left edge. In some implementations, the position of the first layer separation object 30 may be changed in response to the generation of input events. For example, the first layer separation object 30 may be initially placed, at time $t_1$, at the lower left edge of the display unit 140 and subsequently moved, at time $t_2$, to another position in response to an input event.

For example, at time $t_2$, the first layer separation object 30 may be output at a selected edge among multiple edges of the display unit 140. For example, the first layer separation object 30 may be output at the lower edge of the display unit 140 as shown, at the upper edge, at the left edge, or at the right edge. The first layer separation object 30 may also be output at multiple (e.g. opposite) edges such as upper and lower edges or left and right edges. The first layer separation object 30 may be represented by a shape arranged along the three or four edges. Characteristics of the shape (or appearance) of the first layer separation object 30, such as width, may be varied according to the number of functions currently being executed. By way of example, the width of the first layer separation object 30 may be varied according to the number or types of functions currently being executed or execution of a new function.

Figure 12:
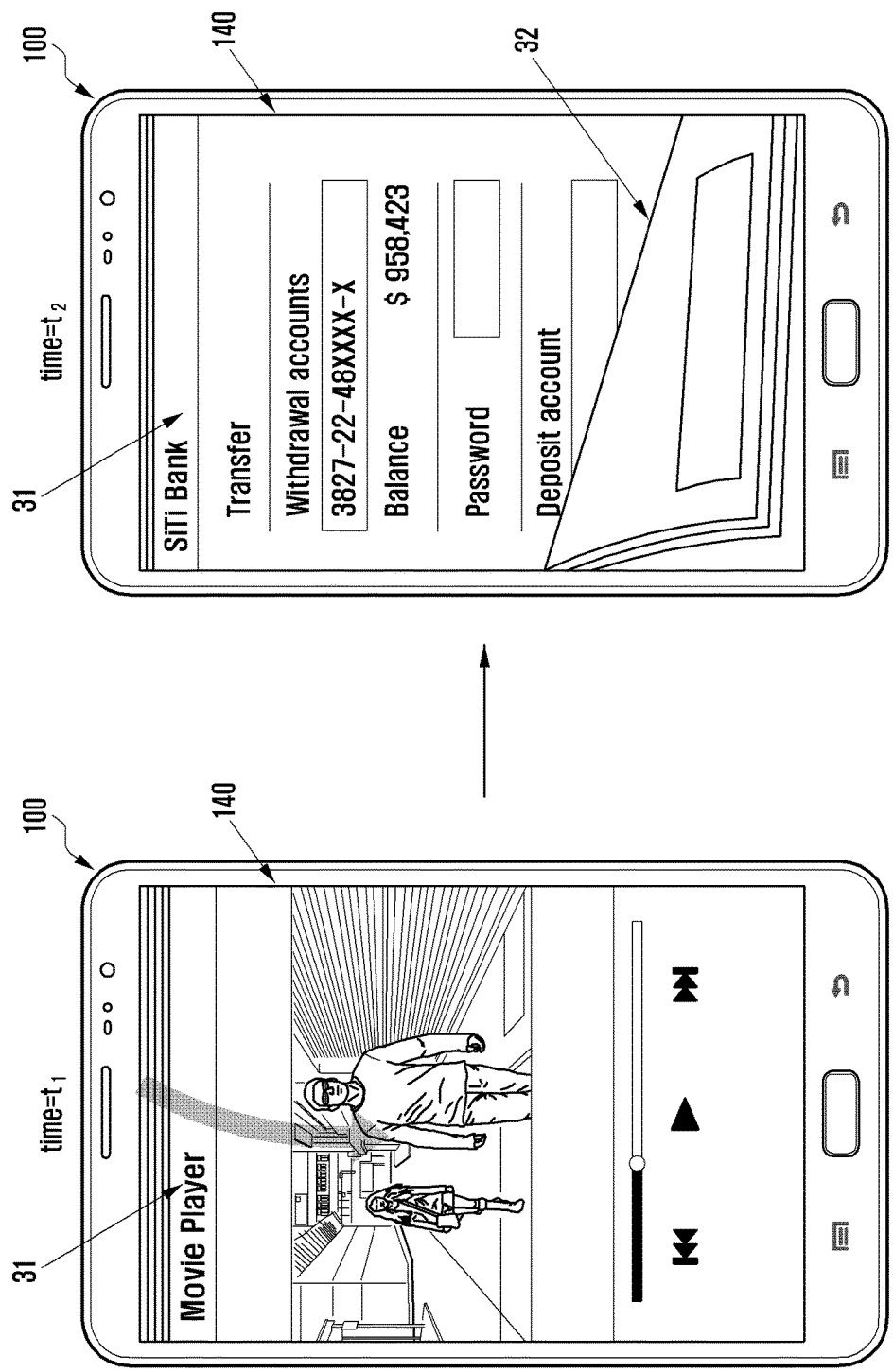
FIG. 12 is a diagram illustrating yet another technique for switching between functions in a function selection mode according to aspects of the present disclosure.

FIG. 12 illustrates a technique for switching between functions in a function selection mode according to aspects of the present disclosure. At time $t_1$, according to generation of an input event for activating the function selection mode, the mobile terminal 100 may display a first layer separation object 31 at an upper region of the display unit 140. The first layer separation object 31 may vary in shape according to the types and number of currently executed functions.

At time $t_2$, the user may use the first layer separation object 31 to refer to a different function execution screen other than the first function execution screen 31 at the top layer on the display unit 140. In particular, when an input event such as drag or flick for moving at least a part of the first function execution screen 31 is generated in a state in which the first layer separation object 31 is output, the mobile terminal 100 may output a second layer separation object 32 by folding or rolling the first function execution screen 31 at the top layer according to the input event. The second layer separation object 32 may be a result of application of an input event requesting folding or rolling of multiple function execution screens at once, or be a result of application of a series of input events each requesting folding or rolling of one function execution screen. As described above, the mobile terminal 100 may display the second layer separation object 32 at only one edge or at multiple edges of the display unit 140.

Figure 13:
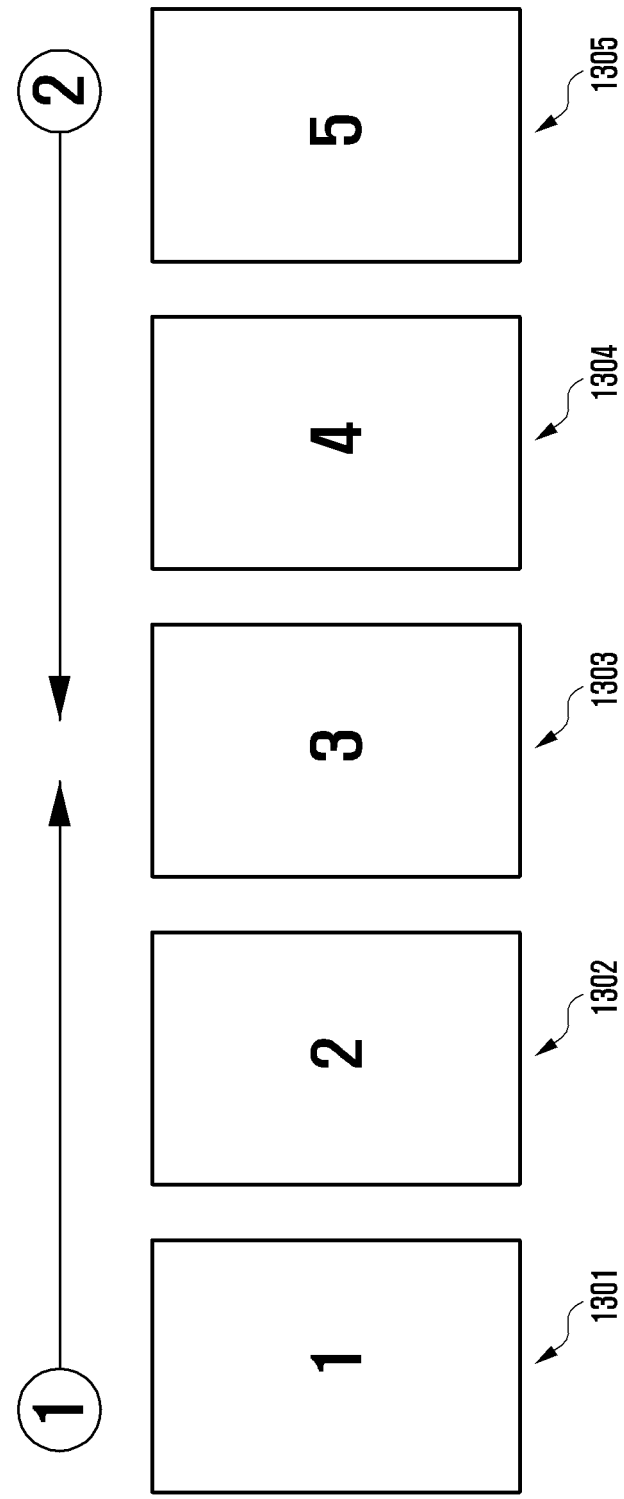
FIG. 13 is a diagram illustrating a logical sequence of function execution screens and changes in screen sequence in response to input events generated on the first layer separation object according to aspects of the present disclosure.

FIG. 13 illustrates a logical sequence of function execution screens and changes in screen sequence in response to input events generated on the first layer separation object according to aspects of the present disclosure. In this example, the mobile terminal 100 maintains five function execution screens 1301, 1302, 1303, 1304 and 1305 corresponding to five functions being executed. According to generation of an input event for activating the function selection mode, the mobile terminal 100 may determine the sequence of the five function execution screens 1301, 1302, 1303, 1304 and 1305. That is, upon generation of an input event for activating the function selection mode in a state wherein the function execution screen 1301 is displayed at the top layer, the mobile terminal 100 may determine the sequence of the remaining function execution screens. For example, the mobile terminal 100 may arrange the function execution screens, from top layer to bottom, as 1301, 1302, 1303, 1304 and 1305. Hence, when the user repeatedly generates a touch gesture requesting function switching or function referencing by removing the top layer function execution screen from the display unit 140, the mobile terminal 100 may display the function execution screens 1302, 1303, 1304 and 1305 in the indicated sequence on the display unit 140. In one example, when the user flips the screen 1301, the screen 1302 may be displayed. Afterwards, when the user flips the screen 1302, the screen 1303 may be displayed. Thus, as illustrated in FIG. 13, the logical sequence of function execution screens determines what screen will be displayed next when an input event is generated for switching, at least partially, the function execution terminal screen that is displayed in the top layer.

In some implementations, the mobile terminal 100 may arrange the sequence of function execution screens in terms of relatedness to the currently displayed function execution screen. That is, a function execution screen closely related to the currently displayed function execution screen is arranged in sequence closely to the currently displayed function execution screen. For example, when an input event for activating the function selection mode is generated in a state wherein the function execution screen 1303 is displayed, the mobile terminal 100 may examine relatedness between the function execution screen 1303 and the remaining function execution screens and rearrange the sequence of the remaining function execution screens according to the examination result.

More specifically, assume that the function execution screen 1303 is related to a webpage of a bank server, the function execution screen 1301 is related to a calculator function, and the function execution screen 1305 is related to a memo function. Assume further that terminal usage histories indicate that the calculator function and memo function have been frequently used when the bank server is accessed. Then, when an input event for activating the function selection mode is generated in a state wherein the function execution screen 1303 is output, the mobile terminal 100 may arrange the function execution screens, from the top layer, as 1303, 1301, 1305, 1302 and 1304.

When screen selection supports a toggle feature, the mobile terminal 100 may arrange the function execution screens, from the top layer, as 1303, 1301, 1302, 1304 and 1305. To this end, according to the type, shape or direction of an input event generated for activating the function selection mode, the mobile terminal 100 may output a layer separation object at the lower left edge of the display unit 140 or output a layer separation object at the lower right or upper right edge. Thereafter, when a touch gesture is input on the layer separation object output at the lower left edge, the mobile terminal 100 may arrange the function execution screens, from the top layer, as 1303, 1301, 1302, 1304 and 1305. When a touch gesture is input on the layer separation object output at the lower right or upper right edge, the mobile terminal 100 may arrange the function execution screens, from the top layer, as 1303, 1305, 1304, 1302 and 1301.

In the above description, relatedness is determined according to usage histories of the mobile terminal 100. However, the present disclosure is not limited thereto. That is, the user or designer may configure settings for relatedness between specific functions of the mobile terminal 100. For relatedness setting, the mobile terminal 100 may provide a screen for listing functions and a menu for specifying relatedness between functions. The mobile terminal 100 may regard a first function associated with the current top layer function execution screen as being related to a second function associated with the previous top layer function execution screen and configure relatedness settings between the functions accordingly. Thus, in some implementations, the logical sequence of the function execution screens 1301-1305 may be determined based on a specification that is stored in memory that identifies two or more of the function execution screens as being related to one another.

Such relatedness settings may be used to sequentially arrange two function execution screens associated with two related functions when an input event for activating the function selection mode is generated in a state wherein the two functions are executed at the same time in a multitasking environment and one of the function execution screens is displayed as a top layer screen on the display unit 140. Hence, this screen rearrangement feature may be utilized to rearrange the sequence of function execution screens instead of function switching or function referencing in the function selection mode according to user preference.

Figure 14:
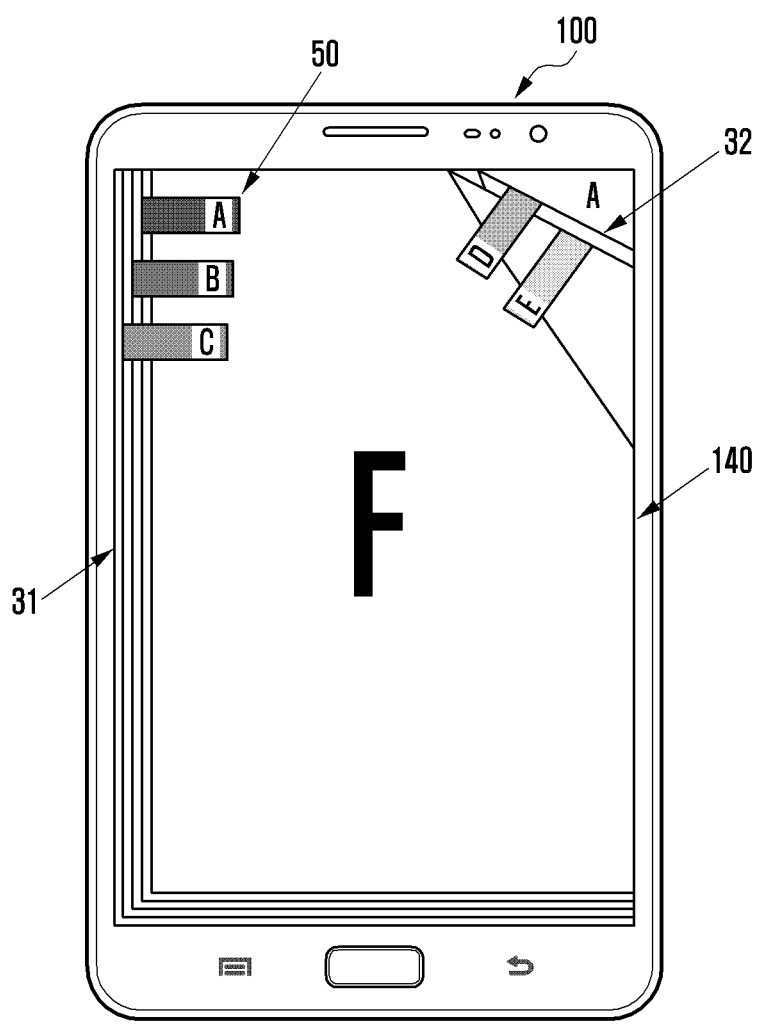
FIG. 14 is a diagram illustrating yet another technique for switching between functions in a function selection mode according to aspects of the present disclosure.

FIG. 14 illustrates a technique for switching between functions in a function selection mode according to aspects of the present disclosure. As illustrated, the mobile terminal 100 may attach a label 50 to at least one of the first layer separation object 31 and a second layer separation object 32. One end of the label 50 is connected to a line of the layer separation object, and the label 50 may have index information of a function execution screen indicated by the line. For example, when a function execution screen is related to a website, a label 50 attached to the function execution screen may have address information of the website or an image or text representing the website. As an example, in a multitasking environment wherein six functions A, B, C, D, E and F are executed and function execution screens thereof are output upon request, when an input event for activating the function selection mode is generated, the mobile terminal 100 may attach labels 50 respectively having A, B, C, D, E and F as index information to lines of the layer separation objects as shown in FIG. 14. The labels 50 enable function execution screens stacked at the layer separation object to be readily identified. Accordingly, the user may directly select not only the second function execution screen but also the third or fourth function execution screen from the top layer among multiple layered function execution screens and use the selected function execution screen for function switching or referencing. Labels 50 attached to the second layer separation object 32 enable folded function execution screens to be readily identified for function referencing. Labels 50 attached to the first layer separation object 31 may be different in terms of display position from labels 50 attached to the second layer separation object 32.

A label may be not assigned to the current top layer function execution screen (for example, the function execution screen F). When the function execution screen F is folded and moved to the second layer separation object 32 or the folded function execution screen E is restored from the second layer separation object 32 to the top layer, a label 'F' may be assigned to the function execution screen F.

As described above, in a multitasking environment, selection operation for function execution screens of the present disclosure enables the user to identify a function execution screen in an intuitive manner and to switch or refer to a different function execution screen.

In the above description, a function execution screen is depicted as being associated with one function. However, a certain function such as a web browser function may be associated with one or more function execution screens.

Meanwhile, the mobile terminal 100 may further include various components according to design. For example, when the mobile terminal 100 is a communication terminal, the mobile terminal 100 may further include a local area communication module for local area communication, a data communication interface based on wired and wireless communication, an Internet communication module for Internet access and communication, and a digital broadcast reception module for receiving and playing digital broadcasts. Although possible variations according to the trend of digital convergence are too numerous to enumerate, it should be apparent to those skilled in the art that the mobile terminal 100 may further include a unit comparable to the above-described units, and one unit of the mobile terminal 100 may be removed or replaced with another unit.

The mobile terminal 100 of the present disclosure may be any information and communication appliance or multimedia appliance, such as a mobile communication terminal based on communication protocols supporting various communication systems, a portable multimedia player (PMP), a digital broadcast receiver, a personal digital assistant (PDA), a music player like an MP3 player, a portable game console, a smartphone, a laptop computer, or a handheld computer.

Hereinabove, embodiments of the present disclosure have been described with reference to the accompanying drawings. Specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

The above examples are provided for illustrative purposes only. Any of the operations discussed with respect to FIGS. 3 and 4 may be executed concurrently, in a different order, or altogether omitted. Although, aspects of the disclosure are presented in the context of a mobile device, the above-described techniques and concepts may be implemented on any type of electronic device that includes a display screen. By way of example, and without limitation, the term "function" may refer to one or more processor-executable instructions which when executed by a processor (or processing circuitry) causes the processor to perform one or more functions (or operations). For example, in some instances, the term "function" may refer to a software application. Additionally or alternatively, as another example, the term "function" may refer to a portion of a software application.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc.

that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

What is claimed is:

1. A method for multitasking in an electronic device, the method comprising:
    after displaying a first application execution screen of a first application as a top layer screen on a display unit, the first application execution screen including a plurality of objects, receiving a first touch input at a first edge region of the display unit;
    in response to the first touch input, displaying a first layer separation object while maintaining display of all of the plurality of objects and a respective shape for each of the plurality of objects, the first layer separation object including one or more lines extending along a vertical length of the display unit,
        wherein each of the one or more lines corresponds to an executing application other than the first application, and
        wherein after detecting the first touch input and prior to detecting any movement from the first touch input, the first application execution screen is shifted and the first layer separation object is displayed within a screen area from which the first application execution screen is shifted; and
    in response to detecting a drag movement beginning from the first touch input, simultaneously displaying a portion of a second application execution screen of a second application and a portion of the first application execution screen,
    wherein the simultaneously displaying comprises:
        gradually increasing a display portion of the second application execution screen and gradually decreasing a display portion of the first application execution screen when a direction of the drag movement is toward a second edge region opposite to the first edge region, and
        gradually increasing a display portion of the first application execution screen and gradually decreasing a display portion of the second application execution screen when a direction of the drag movement is toward the first edge region.

2. The method of claim 1, further comprising: automatically replacing the first application execution screen entirely with the second application execution screen when the drag movement reaches a preset region of the display unit,
    wherein the first application execution screen is displayed as overlapping the first layer separation object prior to detecting the drag movement beginning from the first touch input, and
    wherein shifting the first application execution screen includes moving an entirety of the first application execution screen from an original display position to a new display position, after detecting the first touch input and prior to detecting any movement from the first touch input.

3. The method of claim 1, further comprising arranging, on the first layer separation object, labels having identification information of different ones of the application execution screens that are not displayed as the top layer screen.

4. The method of claim 1, wherein the displaying of the first layer separation object further comprises one of:
    displaying the first layer separation object as an overlay on the first application execution screen; and
    resizing the first application execution screen so as to free space to accommodate the first layer separation object.

5. The method of claim 1, further comprising redefining a display sequence of different application execution screens from the application execution screens currently being executed according to a display position of the first layer separation object.

6. The method of claim 1, wherein a shape of the first layer separation object is defined in part by a width that is based on a number of application execution screens that can be revealed during multitasking.

7. The method of claim 1, further comprising:
    removing the first layer separation object from display on the display unit when the first application execution screen is replaced entirely with the second application execution screen.

8. The method of claim 1, further comprising:
    detecting a second touch input that is received while the electronic device is in a state in which the first layer separation object is displayed together with the first application execution screen; and
    responsive to the second touch input, folding the first application execution screen, the folding comprising:
    removing a portion of the first application execution screen from display on the display unit, displaying a second layer separation object split from the first layer separation object, and displaying a portion of the second application execution screen as the top layer screen in an area of the display unit that was previously occupied by the removed portion of the first application execution screen.

9. The method of claim 8, further comprising one of:
    removing from display, in response to a third touch input, a remaining portion of the first application execution screen that is displayed as the top layer screen and displaying the second application execution screen as the top layer screen in full screen format; and
    displaying, when no touch input is received for a preset time or in response to a fourth touch input, the first application execution screen as the top layer screen in full screen format and removing the portion of the second application execution screen from display.

10. The method of claim 8, further comprising:
    performing, in response to a third touch input, at least one of information selection, information copy, information transfer, information storage, information search and information invocation on one or more of the first application execution screen and the second application execution screen.

11. The method of claim 8, further comprising unfolding the first application execution screen when a drag gesture starting with a touch on the second layer separation object and moving toward the first layer separation object is performed on the display unit.

12. The method of claim 8, further comprising assigning labels having identification information of application execution screens to at least one of the first layer separation object and the second layer separation object.

13. The method of claim 1, further comprising:
arranging a plurality of application execution screens in a layering order that is based on a relatedness between the plurality of application execution screens.

14. The method of claim 13, further comprising forming association between functions related with the application execution screens in the plurality of application execution screens according to relatedness examination results, and wherein the forming of the association comprises at least one of: associating functions invoked in succession based on usage histories of the application execution screens, associating two different functions according to an input signal, and associating two different functions according to preset settings.

15. The method of claim 13, wherein the arranging comprises placing a third application execution screen that is more closely related to the first application execution screen than a fourth application execution screen closer to the first execution screen in the layering order than the fourth application execution screen.

16. An electronic device supporting multitasking, comprising:
a display unit;
an input unit for detecting touch input; and
a processor, operatively coupled to the display unit and the input unit and configured to execute operations comprising:
after displaying a first application execution screen of a first application as a top layer screen of the display unit, the first application execution screen including a plurality of objects, detecting via the input unit a first touch input at a first edge region of the display unit;
in response to the first touch input, displaying a first layer separation object while maintaining display of all of the plurality of objects and a respective shape for each of the plurality of objects, the first layer separation object including one or more lines extending along a vertical length of the display unit,
wherein each of the one or more lines representing an executing application other than the first application, and
wherein after detecting the first touch input and prior to detecting any movement from the first touch input, the first application execution screen is shifted and the first layer separation object is displayed within a screen area from which the first application execution screen is shifted; and
in response to detecting a drag movement beginning from the first touch input, simultaneously displaying a portion of a second application execution screen of a second application and a portion of the first application execution screen,
wherein the simultaneously displaying comprises:
gradually increasing a display portion of the second application execution screen and gradually decreasing a display portion of the first application execution screen when a direction of the drag movement is toward a second edge region opposite to the first edge region, and
gradually increasing a display portion of the first application execution screen and gradually decreasing a display portion of the second application execution screen when a direction of the drag movement is toward the first edge region.

17. The electronic device of claim 16, wherein the processor is further configured to automatically replace the first application execution screen entirely with the second application execution screen when the drag movement reaches a preset region of the display unit,
wherein the first application execution screen is displayed as overlapping the first layer separation object prior to detecting the drag movement beginning from the first touch input, and
wherein shifting the first application execution screen includes moving an entirety of the first application execution screen from an original display position to a new display position, after detecting the first touch input and prior to detecting any movement from the first touch input.

18. The electronic device of claim 17, wherein the preset region is the second edge region of the display unit.

19. The electronic device of claim 17, wherein the preset region is closer to the second edge region than the first edge region.

20. The method of claim 2, wherein the preset region is the second edge region of the display unit.

21. The method of claim 2, wherein the preset region is close to the second edge region than the first edge region.

* * * * *